(12) United States Patent
Cornay

(10) Patent No.: US 10,174,784 B1
(45) Date of Patent: Jan. 8, 2019

(54) BUNGEE CORD WITH INTERLOCKING HOOKS

(71) Applicant: Bolder Products, LLC, Longmont, CO (US)

(72) Inventor: Paul J. Cornay, Longmont, CO (US)

(73) Assignee: Bolder Products, LLC, Longmont, CO (US)

( * ) Notice: Subject to any disclaimer, the term of this patent is extended or adjusted under 35 U.S.C. 154(b) by 0 days.

(21) Appl. No.: 15/669,160

(22) Filed: Aug. 4, 2017

Related U.S. Application Data

(63) Continuation of application No. 14/950,979, filed on Nov. 24, 2015, now Pat. No. 9,797,431, which is a (Continued)

(51) Int. Cl.
*F16B 45/00* (2006.01)
*B60P 7/08* (2006.01)

(52) U.S. Cl.
CPC ............... *F16B 45/00* (2013.01); *B60P 7/08* (2013.01); *Y10T 24/312* (2015.01); *Y10T 24/3488* (2015.01); *Y10T 24/4755* (2015.01)

(58) Field of Classification Search
CPC .......... F16B 45/00; B60P 7/08; Y10T 24/312; Y10T 24/45199; Y10T 24/3488
See application file for complete search history.

(56) References Cited

U.S. PATENT DOCUMENTS

| 1,583,029 | A | 5/1926 | Thomas |
| D92,798 | S | 7/1934 | Furtsch |

(Continued)

FOREIGN PATENT DOCUMENTS

EP  1717482  11/2006

OTHER PUBLICATIONS

Internet discussion of a "Better Bungee Cord with Hooks that Fit Togther like Puzzle Pieces", at Quirky.com (http://www.quirky.com/ideations/64999) (last visited May 2011).

*Primary Examiner* — Robert Sandy
*Assistant Examiner* — Michael S Lee
(74) *Attorney, Agent, or Firm* — Garvey, Smith & Nerhbass, Patent Attorneys, L.L.C; Seth M. Nehrbass; Julie R. Chauvin

(57) ABSTRACT

Interlocking hook assemblies for elastic straps include an elastic member 500 including a pair of similar interlocking hook devices 100 connected to each end of elastic member 501. Each interlocking hook device 100, is provided with a connector 300 which is fixedly attached thereon. Each hook device can be connected, preferably in a locking manner, onto the other hook device creating a closed hook assembly thereby disabling the hooks to prevent entanglement of elastic or rigid straps when not in use or during storage and/or transportation. Multiple elastic straps 500 can be connected end-to-end forming an elongated elastic strap of desired length having closed central hooks with open hooks on each end. Interlocking hook assemblies for elastic members include an elastic member with interlocking hook devices 900 including two similar interlocking hook devices 800 with a connector groove 801 and a catch feature 802 and elastic member 811. Each interlocking hook device 800 is provided with a groove 801 and catch feature 802 designed to allow each hook to engage the other within their respective grooves and to releasably lock them together. Each hook device can be engaged and preferably locked onto the other hook device thereby disabling the hooks to prevent entanglement of the elastic member when not in use or during storage and/or transportation. Multiple elastic members 900 can be connected end-to-end forming an elongated elastic strap of desired length having closed central hooks with open hooks on each end.

12 Claims, 32 Drawing Sheets

Related U.S. Application Data continuation of application No. 13/492,301, filed on Jun. 8, 2012, now Pat. No. 9,249,825.

(60) Provisional application No. 61/494,708, filed on Jun. 8, 2011.

(56) References Cited

U.S. PATENT DOCUMENTS

| | | |
|---|---|---|
| 2,447,422 A | 8/1948 | Nelson |
| 4,635,438 A | 1/1987 | Rottinghaus |
| D307,705 S | 5/1990 | Mair |
| 4,957,259 A | 9/1990 | Wolf, Jr. |
| 5,003,672 A | 4/1991 | Randall |
| D325,546 S | 4/1992 | Collier |
| D329,371 S | 9/1992 | Jou |
| D330,669 S | 11/1992 | Hui-Chuan |
| 5,224,247 A | 7/1993 | Collier |
| D345,297 S | 3/1994 | Kraine |
| D410,378 S | 6/1999 | Aganian |
| 6,886,796 B1 | 5/2005 | Elander |
| 7,228,600 B1 | 6/2007 | Selby et al. |
| D546,169 S | 7/2007 | Selby |
| D559,103 S | 1/2008 | Van Handel et al. |
| 7,603,754 B2 | 10/2009 | Hayes et al. |
| D625,988 S | 10/2010 | Chan |
| 8,646,157 B2 | 2/2014 | Hayes et al. |
| 9,249,825 B1 | 2/2016 | Cornay |
| 2006/0237609 A1 | 10/2006 | Spencer |
| 2007/0067968 A1* | 3/2007 | Krawczyk .............. F16G 11/143 24/300 |
| 2007/0284326 A1 | 12/2007 | Baloun |
| 2010/0024177 A1 | 2/2010 | Hayes et al. |

\* cited by examiner

BUNGEE CORD WITH INTERLOCKING HOOKS

CROSS-REFERENCE TO RELATED APPLICATIONS

This is a continuation of my prior co-pending U.S. patent application Ser. No. 14/950,979, filed 24 Nov. 2015, which is a continuation of my prior U.S. patent application Ser. No. 13/492,301, filed 8 Jun. 2012. Incorporated herein by reference is my prior U.S. provisional patent application No. 61/494,708, filed 8 Jun. 2011. Priority of this application is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates primarily to interlocking hooks. More particularly, the present invention relates to interlocking hooks for elastic members (bungee cords) and rigid tie down straps.

2. General Background of the Invention

Elastic cord hooks are manufactured in a variety of different designs of which there are two basic designs, open hook and closed/gated hook (hooks with gates to form a closure). The open hook designs are difficult to store and transport when not in use because the hooks naturally engage upon other objects and become easily entangled especially when several or more elastic cords and/or rigid straps are grouped together. The closed or gated hook style utilized in elastic cords attempts to solve the entanglement problem by providing a hook with a spring loaded gate that is closed when the hook is not in use. However, the spring loaded gate creates difficulty for the user while hooking and unhooking the elastic cord hook due to interference of the gate in the hook area. Additionally, the gate opens inward into the hook area limiting the available hook area that would otherwise be available if the gate were not present.

See U.S. Pat. Nos. D92,789; D325,546; D329,371; D330669; D307,705; D345,297; D410,378; D546,169; D559,103S; 2,447,422; 4,957,259; 5,003,672; 5,224,247; 6,886,796; 7,228,600; 7,603,754; Publication No. 2006/0237609; Publication No. 2007/0067968; Publication No. 2007/0284326; and EP 1,717,482A2 and all references cited therein for a background of the invention. All of these references are incorporated herein by reference.

Attempts to solve the problem with elastic cord storage are described in U.S. Pat. Nos. 5,003,672; D559,103; 6,886,796 and Publication No. 2007/0284326 and outline methods in which the elastic cord hook can be covered by a slide-able cover or by means of hooking the elastic cord to a secondary housing, pallet or frame member to prevent entanglement of the elastic cord hooks during storage and transportation. Other attempts to solve the problem with elastic cord storage and transportation are described in U.S. Pat. Nos. D307,705; D329,371; D330,669; D625,988 and 7,228,600 and outline methods in which elastic cord hooks are provided with closing gates which are used to disable the hooks when not in use.

An attempt to provide an elastic cord hook which can be connected end-to-end is described in US Patent Application Publication No. 2007/0067968 wherein the hook is provided with "a receptacle formed in the hook portion for receiving a mating portion of another bungee cord fastener".

One can see a disclosure (concept drawing) of a concept bungee cord with hooks that can be interlocked on a website called Qurky.com (http://www.quirky.com/ideations/64999), which describes itself as a social product development company, where inventors submit their product ideas to an online community that works on them to refine and develop the idea. It appears that this disclosure appeared on the internet around 9 May 2011.

BRIEF SUMMARY OF THE INVENTION

The apparatus of the present invention solves the problems confronted in the art in a simple and straightforward manner. What is provided are interlocking hooks designed to engage and lock upon one another when not in use to prevent entanglement of elastic cords and rigid straps during transportation and storage. Also, the interlocking hooks of the present invention provide a means for the hooks to engage upon one another forming a closed hook assembly while allowing the entire hook area to remain open and unobstructed for ease of use when attaching to other objects. Additionally, the interlocking hooks of the present invention allow for multiple elastic cords and rigid straps to be attached end-to-end offering the user the option to vary the length of cords and rigid straps while the central hooks remain interlocked in a closed hook assembly thereby preventing the central from hooks from engaging other objects while the hooks on each end remain open for use.

The present invention is advantageous over other storage and transportation devices in that it does not require a secondary device to secure and disable the hooks when not in use. Additionally, the present invention allows each elastic cord to be secured and disabled individually thereby providing the user the option to transport one or multiple elastic cords in the secured and disabled condition to the location in which it will be used.

Hooks with closing gates are disadvantageous compared to the present invention because the gates interfere with the function of the hooks and make it cumbersome for the user to hook and unhook the elastic cord due to the requirement to operate the gate while hooking and unhooking the device during operation. The hook engagement capability of the first, second, and third embodiments of the present invention allow for tangle-free transportation and storage of elastic cords and are advantageous over gated hook styles because the hooks can be interlocked upon one another thereby preventing the hooks from hooking undesirable objects without altering or interfering with the function of the hook when put into use.

The present invention is advantageous over the bungee cord fastener described US Patent Application Publication No. 2007/0067968 because it does not have a receptacle located in the hook portion which can interfere with the strength and the function of the hook thereby limiting its use. Additionally, the bungee cord fastener described US Patent Application Publication No. 2007/0067968 does not provide a means to disable the hooks to prevent engagement of the hooks when being transported or stored when in use or not in use as does the present invention.

The first, second, and third embodiments of the present invention are advantageous over the concept bungee cord as described in Qurky.com because each embodiment describes an interlocking hook where the engagement feature is located outside the hook section unlike the concept Qurky.com bungee cord which utilizes the entire hook section geometry as the engagement means, which dramatically limits the utility of the hook.

In a first embodiment of the present invention, a pair of similar hooks is provided with each hook incorporating a connector having a catch feature which allows for the locking engagement of one hook to the other thereby providing a closed hook assembly which will not entangle upon itself or other objects.

In a second embodiment of the present invention, a pair of reinforced, molded plastic hooks is provided with a groove in the base of the hook which allows for one reinforced molded plastic hook to frictionally engage the other thereby providing a closed hook assembly which will not engage upon other objects.

In a third embodiment of the present invention, a pair of reinforced, molded plastic hooks is provided with a groove in the base of the hook having a catch feature which allows for one reinforced molded plastic hook to engage and lock upon the other thereby providing a closed hook assembly which will not engage upon other objects.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 7:
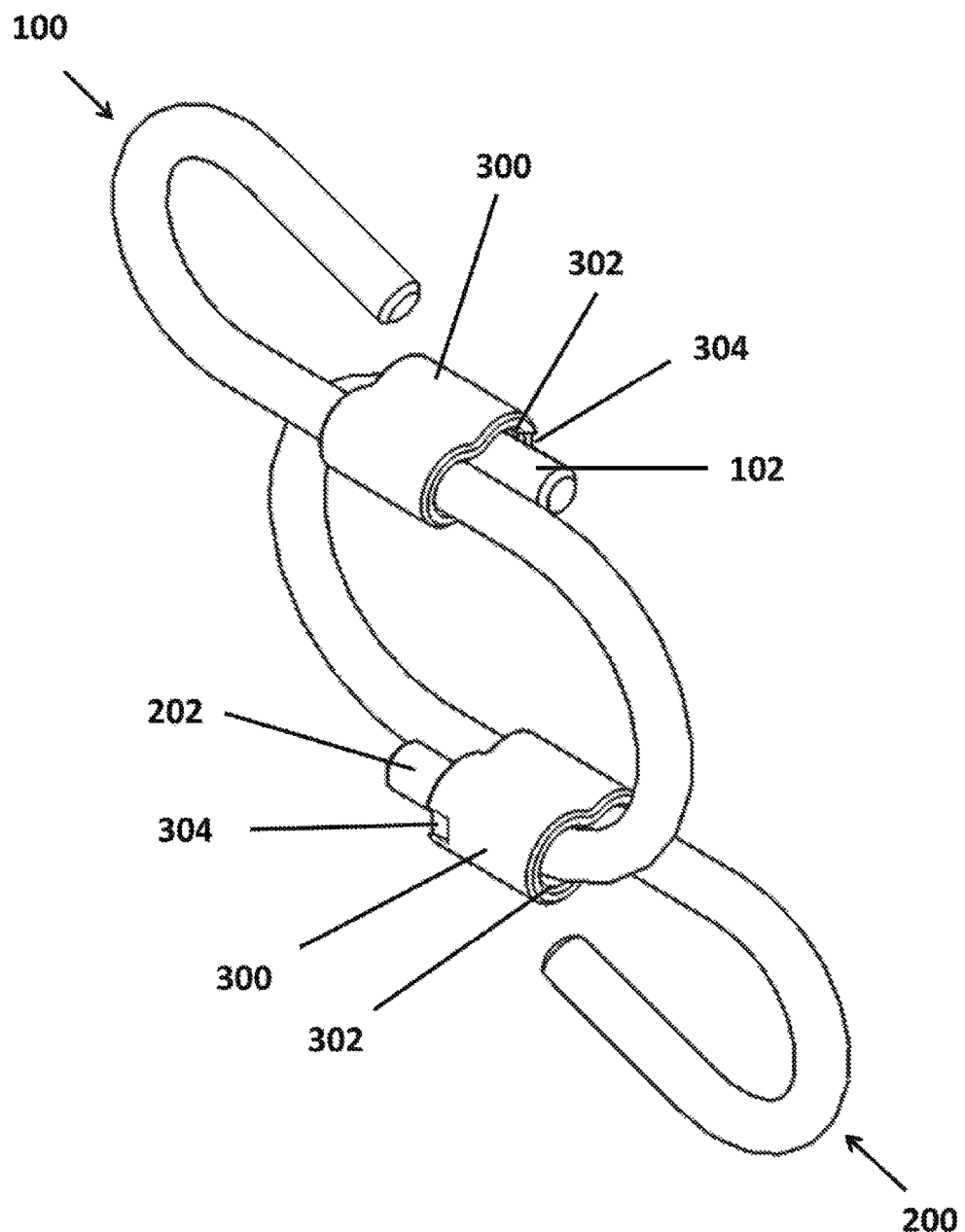
FIG. 7 is an isometric perspective view of the engaged assembly of the first embodiment of the present invention.

Interlocking hook device 100 includes hook 101 with connector 300, with catch feature 304 which provide the ability for two similar hook devices 100 to assemble and lock onto one another thereby forming a closed hook assembly thereby disabling the hooks 101 and providing for tangle-free transportation and storage when not in use. Interlocking hook devices 100 can be connected and locked to interlocking hook device 200 (see FIG. 7) which includes connector 300 rotated 180 degrees with respect to its location on interlocking hook device 100, which provide the ability for the hook devices 100 and 200 to assemble onto one another thereby forming a closed hook assembly thereby disabling the hooks 101 and 201 and providing for tangle free transportation and storage when not in use (see FIGS.

7 and 12). Hook devices 100 and 200 are preferably made of stainless steel. Hook devices 100 and 200 could also be made for example of carbon steel (high carbon spring wire (music wire ASTM A 228 or hard drawn ASTM A 227) which can be coated with a various finishes, including Plastic, Zinc, Chrome, Nickel, Nylon, Brass, Epoxy, Teflon (polytetrafluoroethylene), Halar, etc.)). Elastomeric member 401 typically comes in lengths of 10", 15", 21", 31", 41" and can be made of natural rubber as well as EPDM (ethylene propylene diene monomer—M-class) rubber. It is preferable for elastomeric member 401 to have a tensile strength of 1400 PSI (100 Kg/cm2) to 2200 PSI (150 kg/cm2); elongation @ 50 lbs. —100%+ or −5%; Elongation @ Break—350%; Elongation@ 300%—880 PSI (62 Kg/cm2); Durometer—55+ or −3% IRHD; Stretch Recovery—80-100%; Low Temperature—−40 degrees C.

Figure 1:
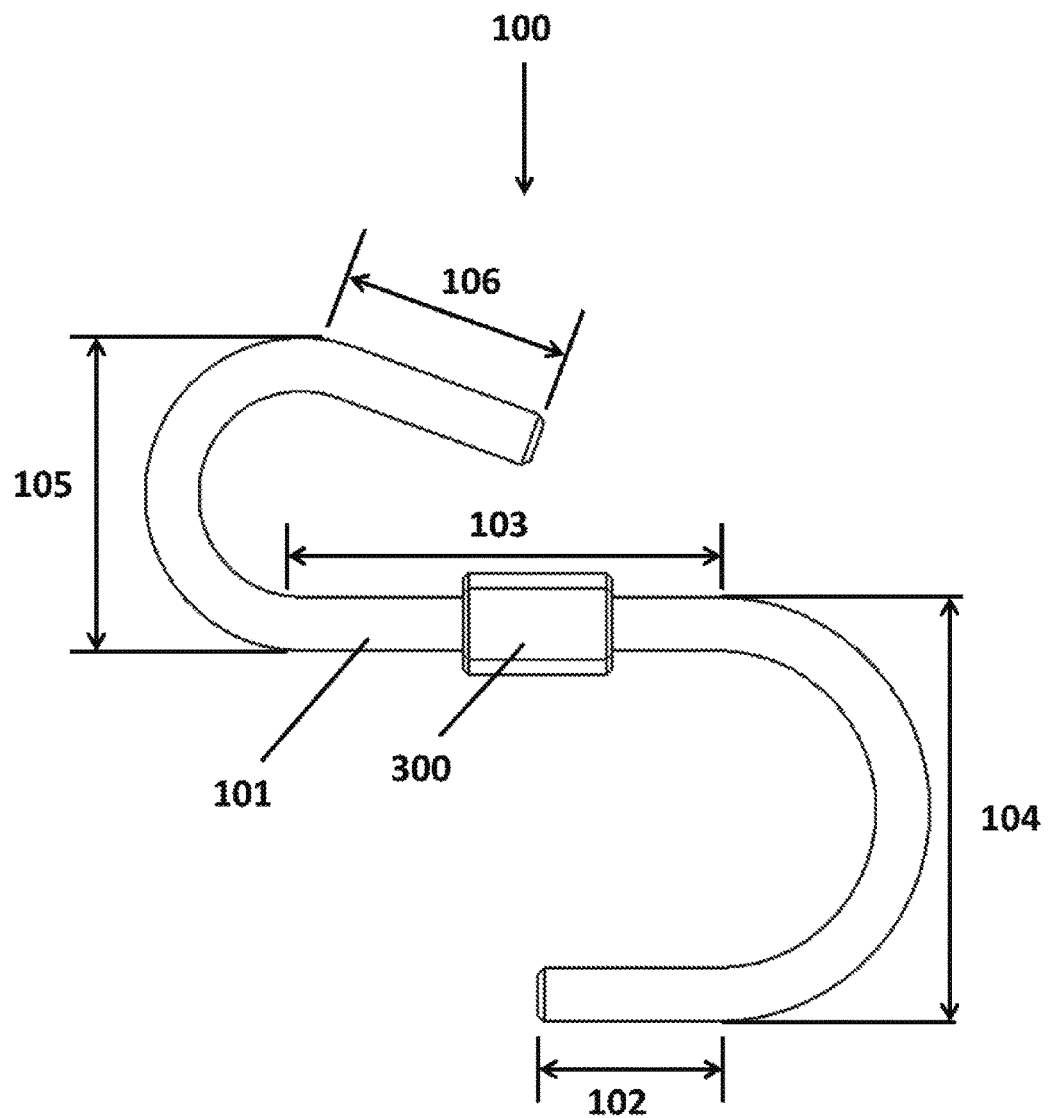
FIG. 1 is a side view of a first component of a first embodiment of the present invention.
Figure 2:
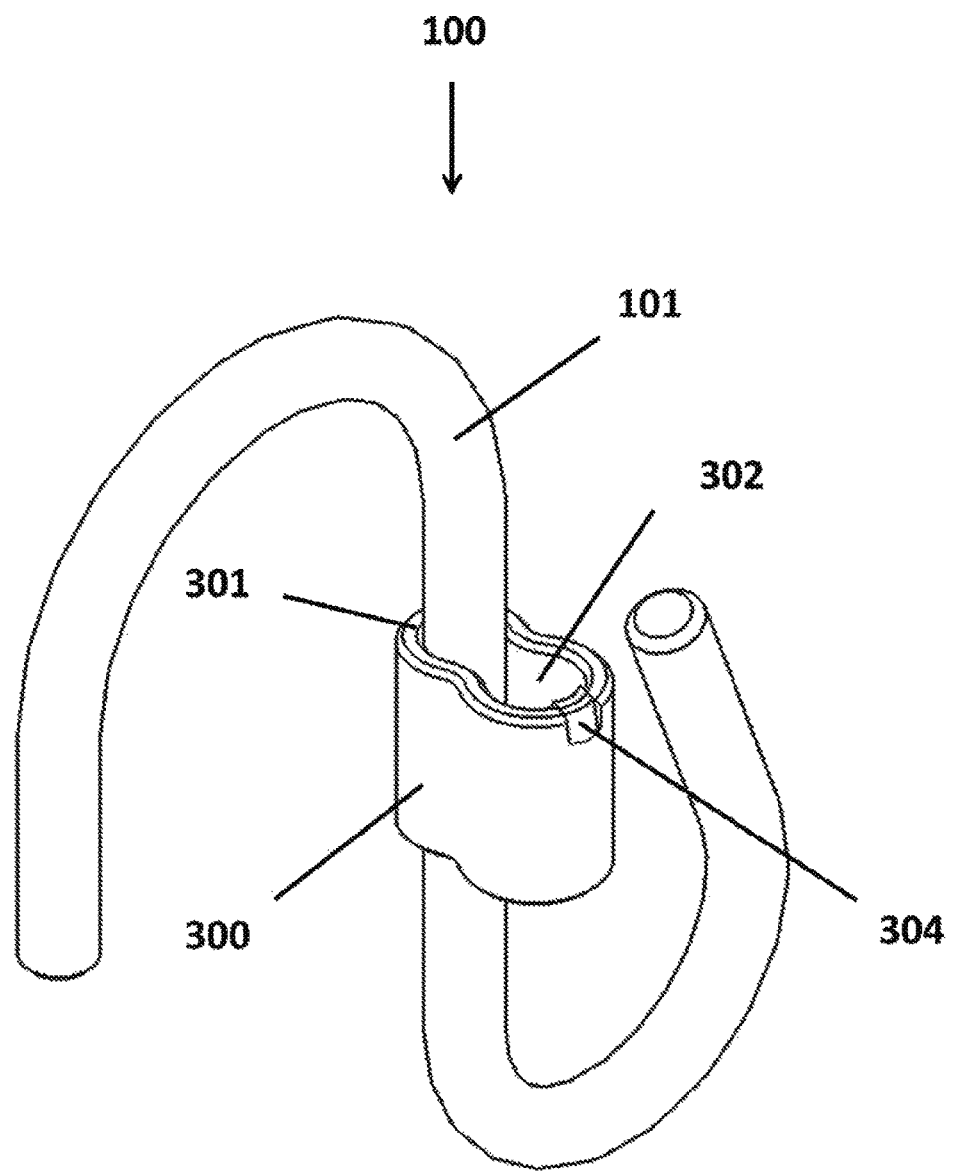
FIG. 2 is an isometric perspective view of the first component of the first embodiment of the present invention.
Figure 3:
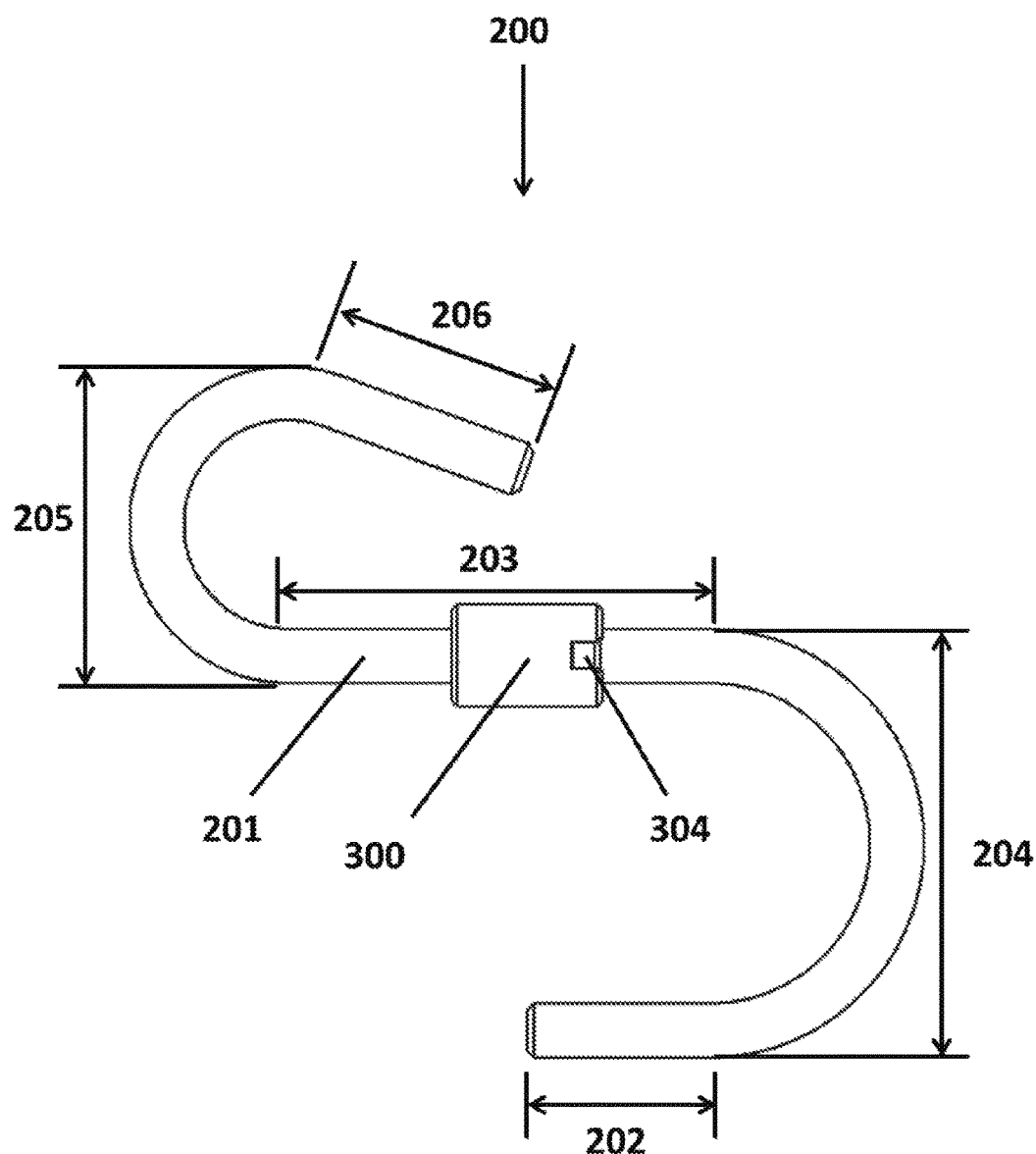
FIG. 3 is a side view of the first embodiment of the present invention.
Figure 4:
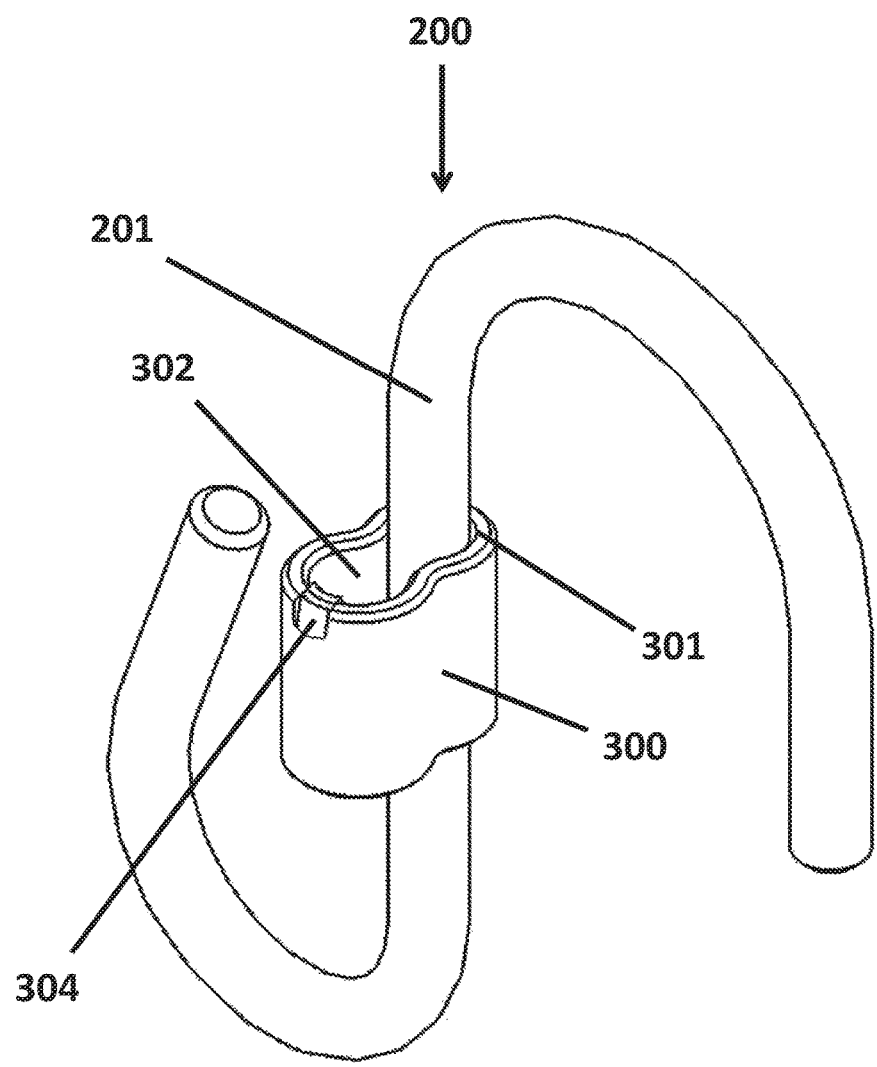
FIG. 4 is an isometric perspective view of the first embodiment of the present invention.
Figure 5:
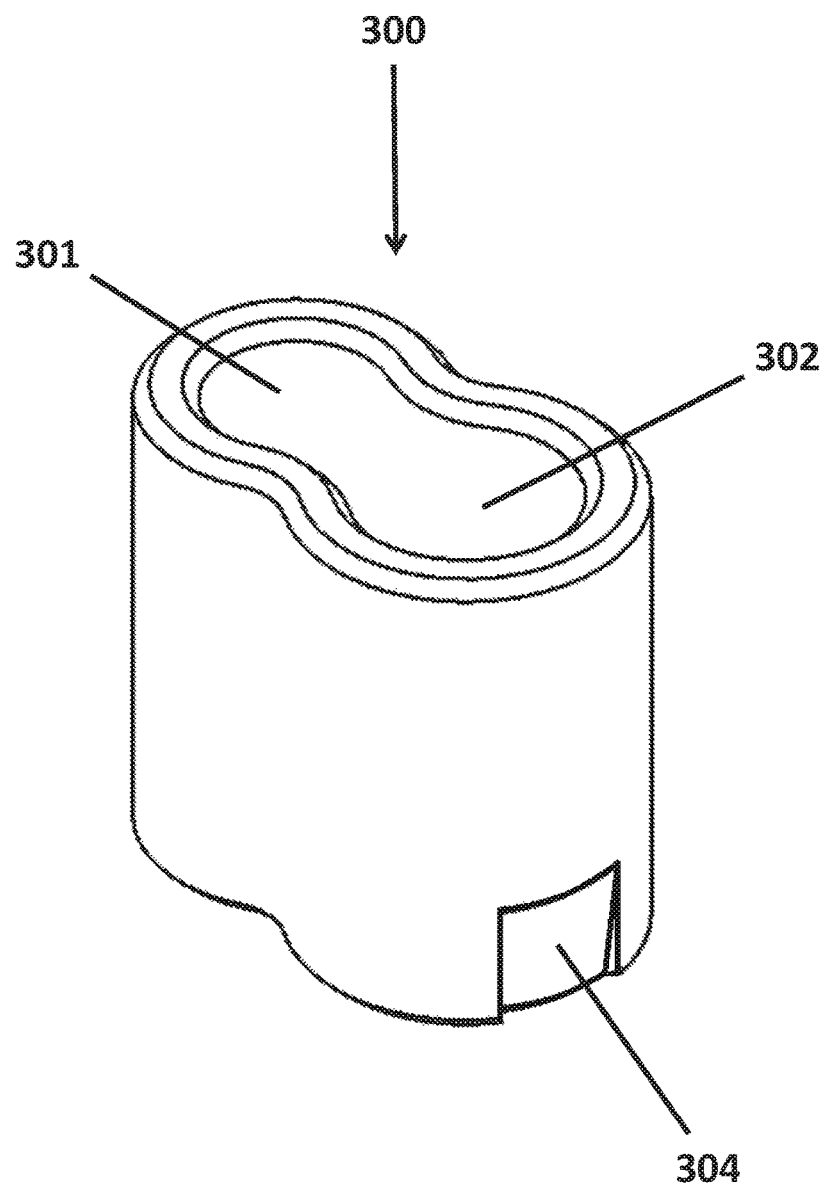
FIG. 5 is an isometric perspective view of the connector component of the first embodiment of the present invention.
Figure 6:
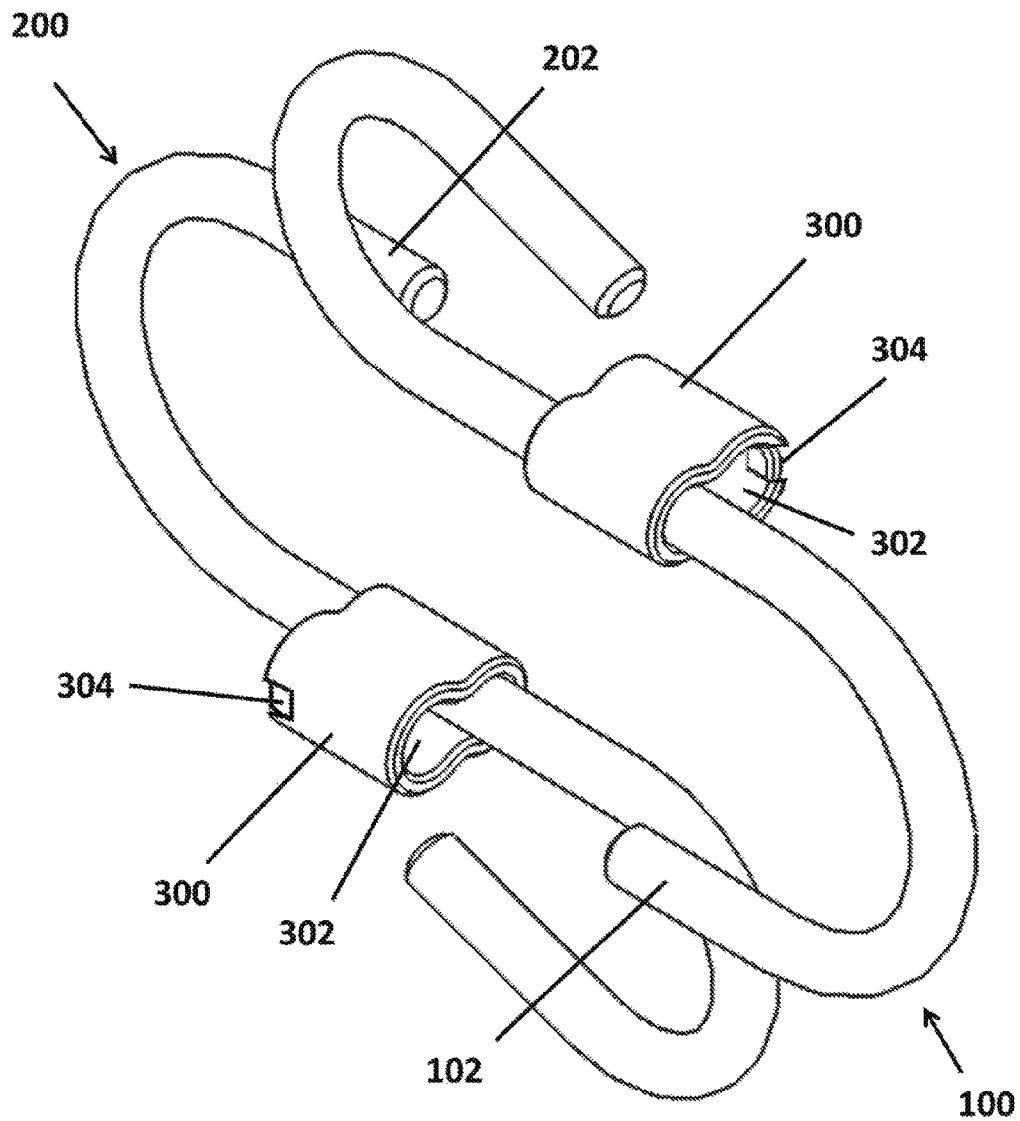
FIG. 6 is an isometric perspective view of the disengaged assembly of the first embodiment of the present invention.

As seen in FIG. 1, interlocking hook device 100 includes a hook 101 comprising a substantially straight shank section 103 connected to a bend section 104 connected to a substantially straight front section 102, and a connector 300 which protrudes outwardly from the side of the substantially straight shank section 103 having a bore 302 having an axis which is parallel (or substantially parallel—it is preferred that it be parallel enough to allow two devices 100 to hook together with a frictional fit or some other fit which releasable locks devices 100 together) to the straight shank section 103 and which lies outside the plane formed by the bend section 104 of the hook device 100. Two similar hook devices 100 can be engaged one upon the other by inserting the substantially straight front section 102 of each hook device into the connector 300 of the other hook device thereby forming a closed hook assembly.

Each hook 101 locks into the connector 300 of the other hook device 100, preferably frictionally (though they could, for example, magnetically lock). Each hook 101 preferably frictionally engages the connector 300 of the other hook device 100 (as with—catch feature 304).

Figure 19:
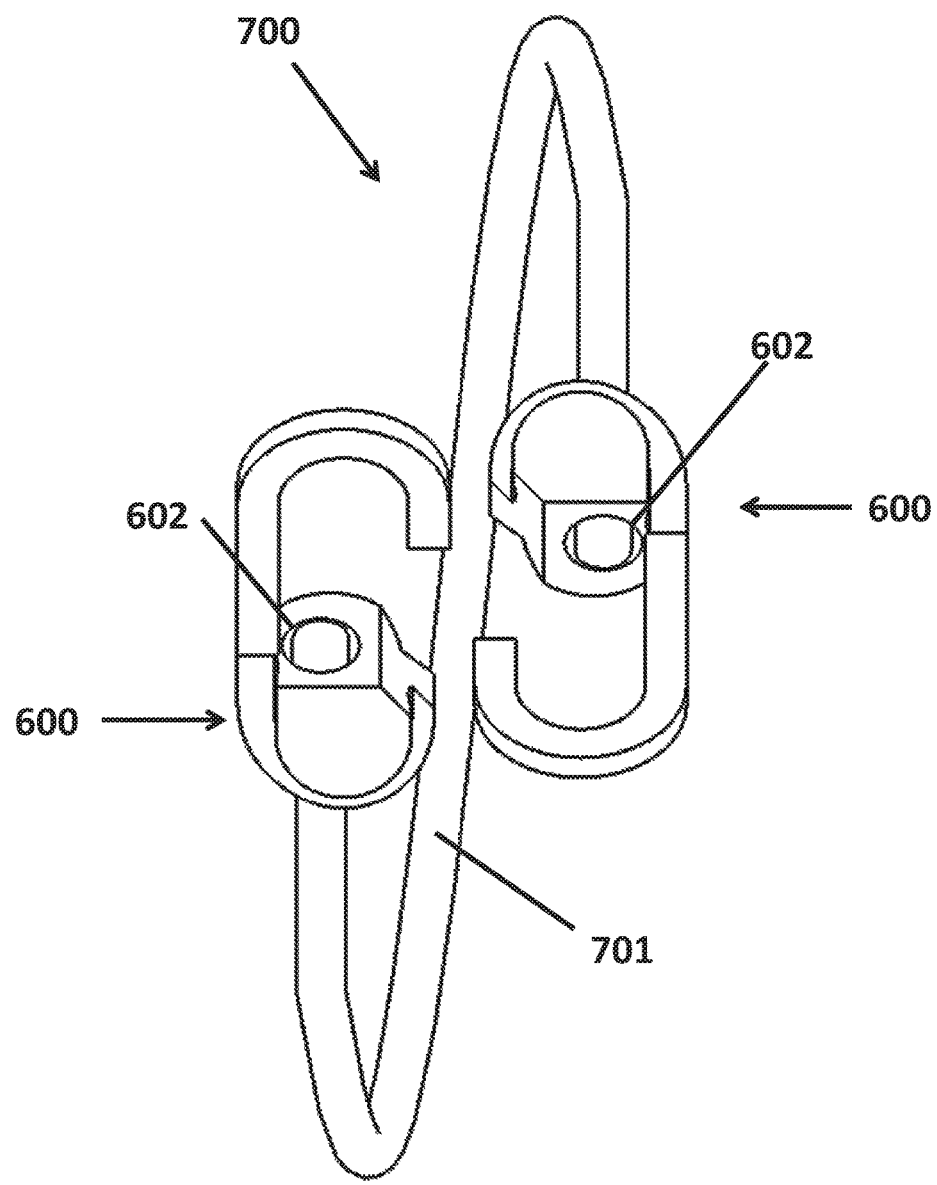
FIG. 19 is an isometric top view of the disengaged assembly of the second embodiment of the present invention with an elastic member.
Figure 20:
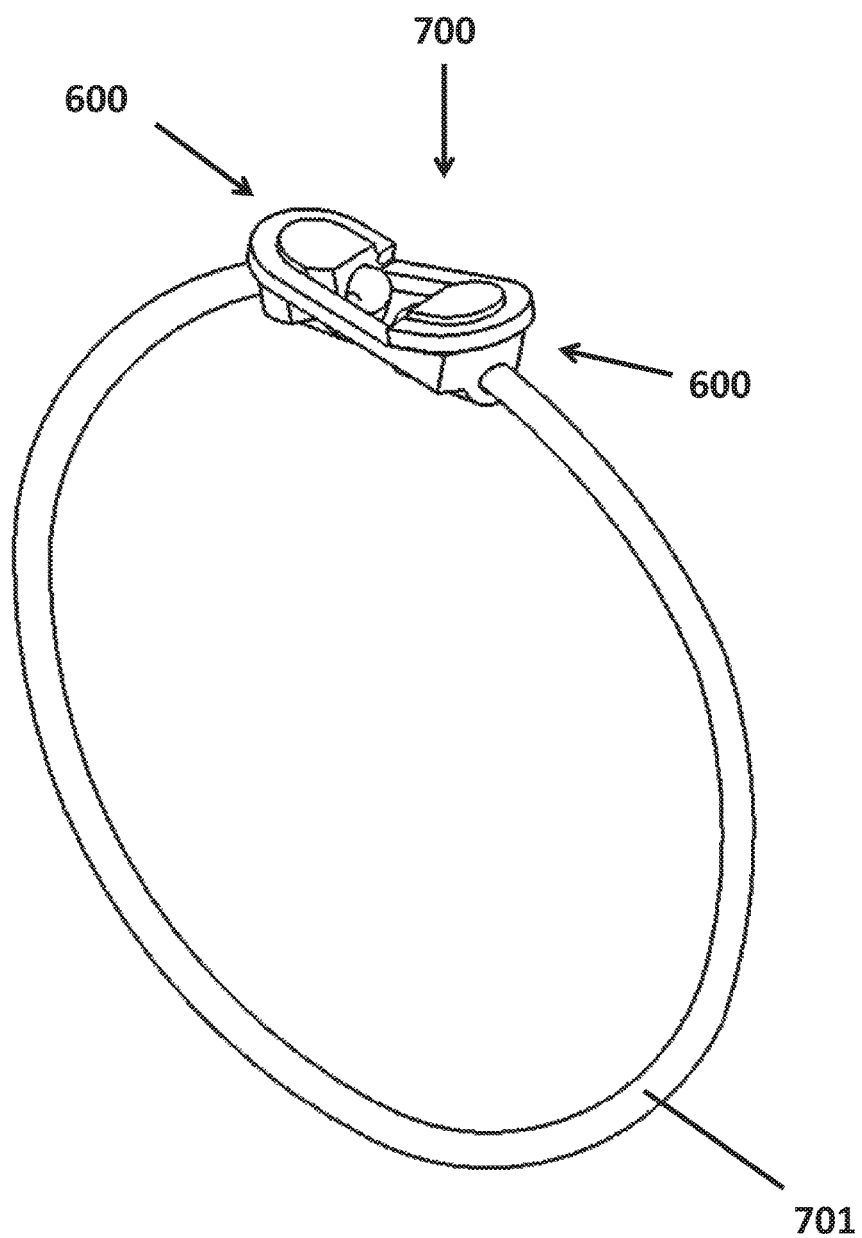
FIG. 20 is an isometric perspective view of the engaged assembly of the second embodiment of the present invention with an elastic member.
Figure 21:
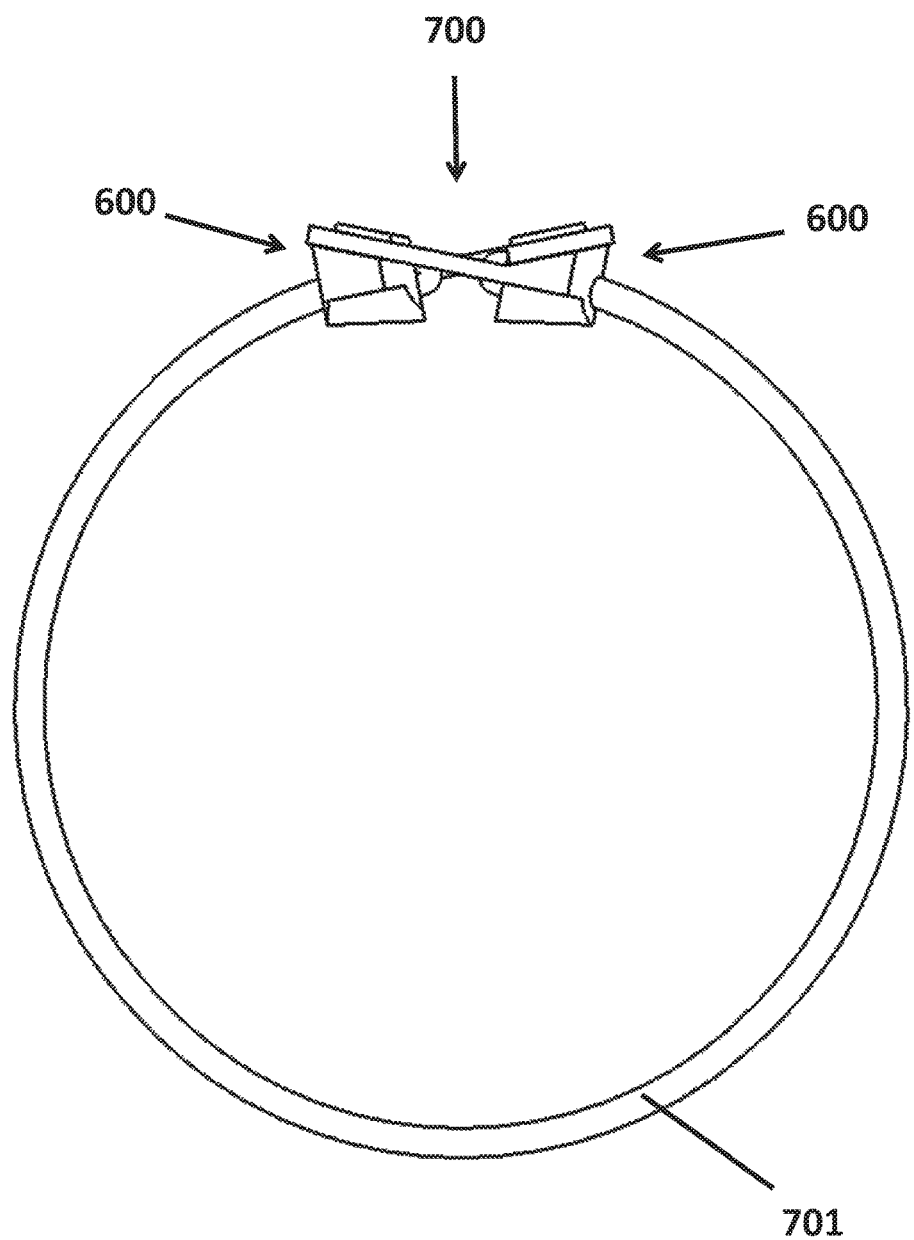
FIG. 21 is an isometric side view of the engaged assembly of the second embodiment of the present invention with an elastic member.

Elastic member 701 (FIG. 19) can be made of continuous natural (latex) or synthetic rubber elastic strands with an outer nylon sheath. Elastic member materials include for example Polypropylene, heavy duty nylon, OCE fiber, and EPDM rubber strands. Elastic member 701 can be made of multiple strands or ribbons of natural or synthetic rubber and is prepared and extruded into long ribbons of rubber. These ribbons are approximately 0.09 inch to 0.12 inch (0.24-0.32 cm) thick, 0.25 inch (0.64 cm) wide and up to 100 feet (30 m) long. The number of ribbons, or strands, in a bungee cord determines the diameter of the cord and the overall tensile strength rating. Standard commercial bungee cord is available in diameters from about 0.25-inch to 0.62-inch (0.64-1.6 cm). Mil-spec cord is available from 0.25-inch to 0.87-inch (0.64-2.2 cm) in diameter. Specifications for a 0.62-inch (1.6 cm) diameter mil-spec cord must weigh 14 pounds per 100 feet (or 6 kg per 30 m), support 250-350 pounds (113-159 kg) at 100% elongation, have a minimum breaking strength of 500 pounds (227 kg), and be able to endure a minimum of 50,000 flex cycles.

Figure 15:
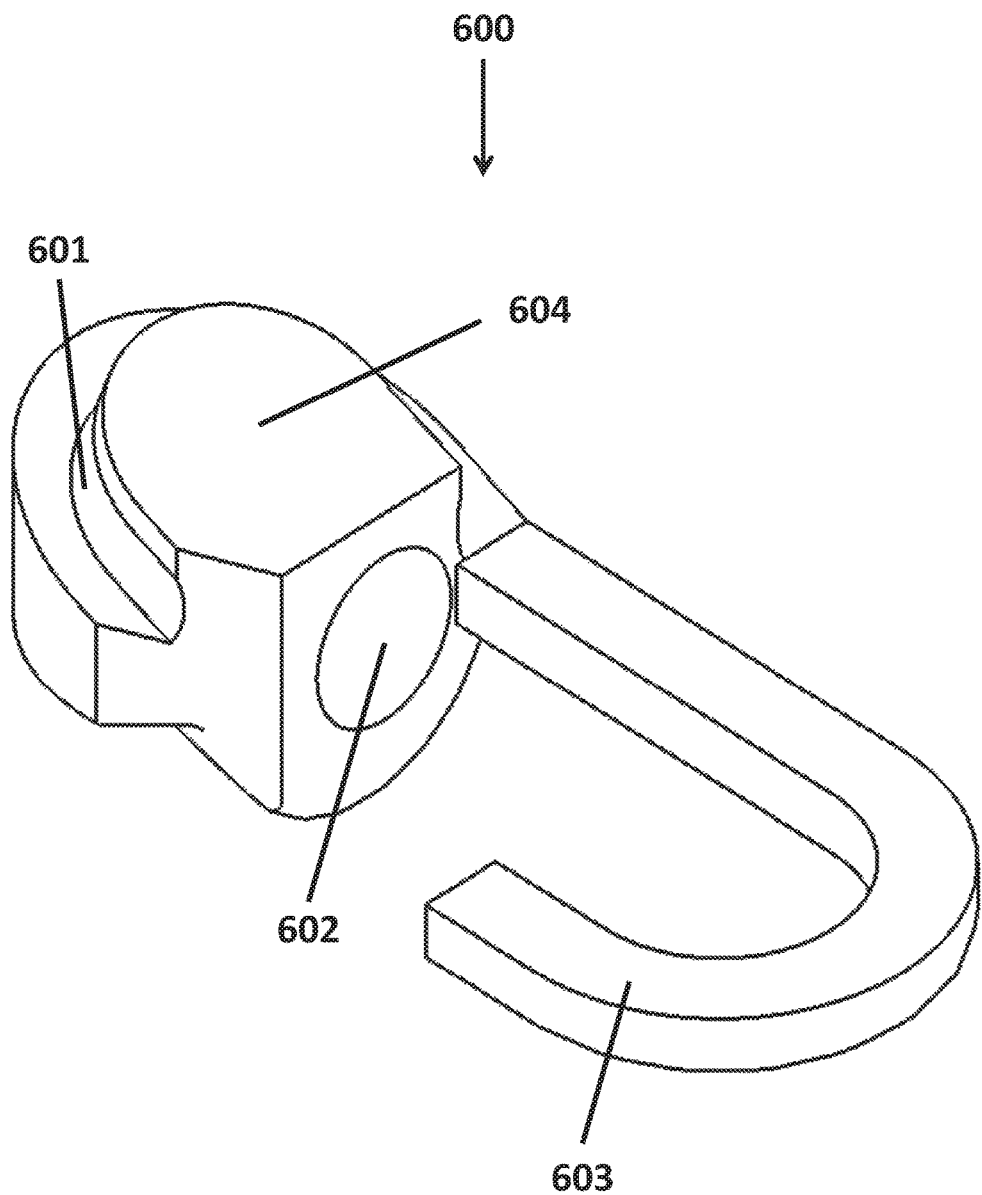
FIG. 15 is an isometric perspective view of a second embodiment of the present invention.
Figure 16:
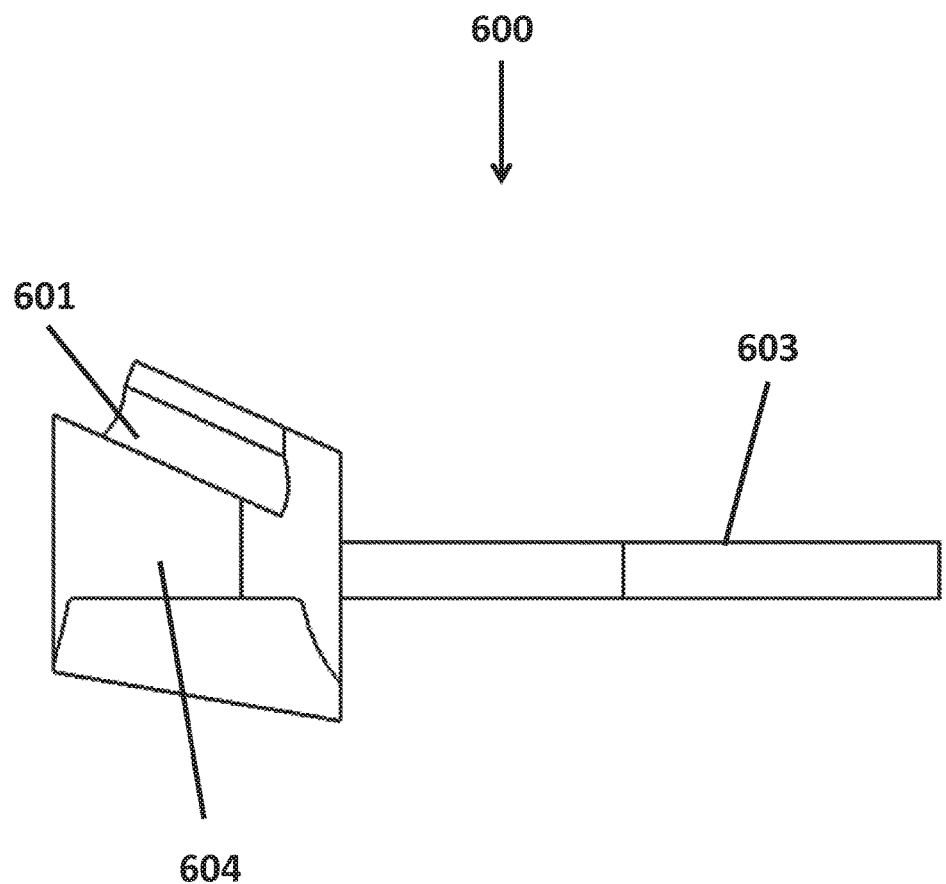
FIG. 16 is a side view of the second embodiment of the present invention.

Interlocking hook device 600 (see FIG. 15) includes hook 603 with hook body 604, which provide the ability for two similar hook devices 600 to assemble and lock onto one another thereby forming a closed hook assembly. Interlocking hook devices 600 can be connected to an elastomeric or elongated flexible member 701 (see FIG. 19) which provides the ability for the hook devices 600 to assemble onto one another thereby forming a closed hook assembly thereby disabling the hooks 603 and providing for tangle free transportation and storage when not in use. As shown in FIG. 15, hook 603 is straight and flat and has a shank section and a bend section. The shank section and bend section lie in a common plane.

Figure 22:
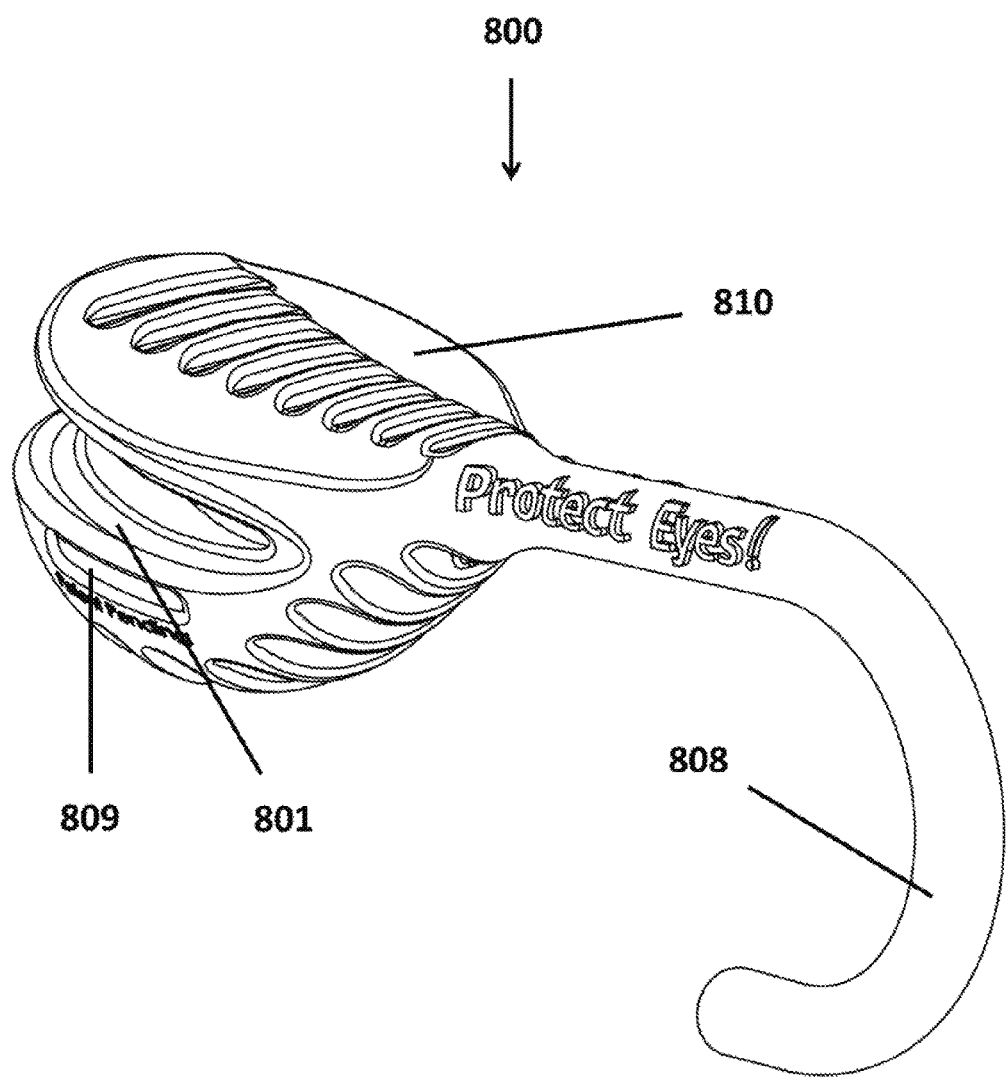
FIG. 22 is an isometric perspective view of a third embodiment of the present invention.
Figure 23:
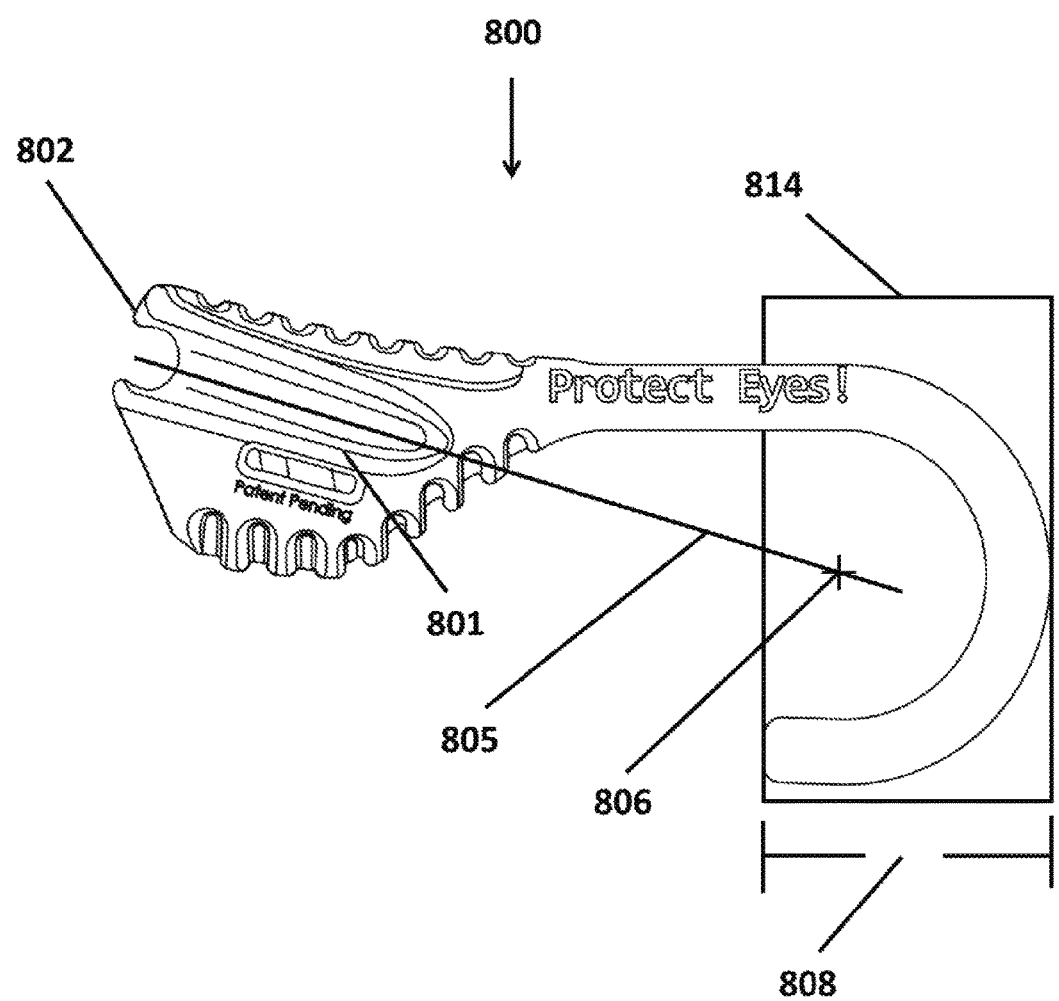
FIG. 23 is a side view of the third embodiment of the present invention.
Figure 24:
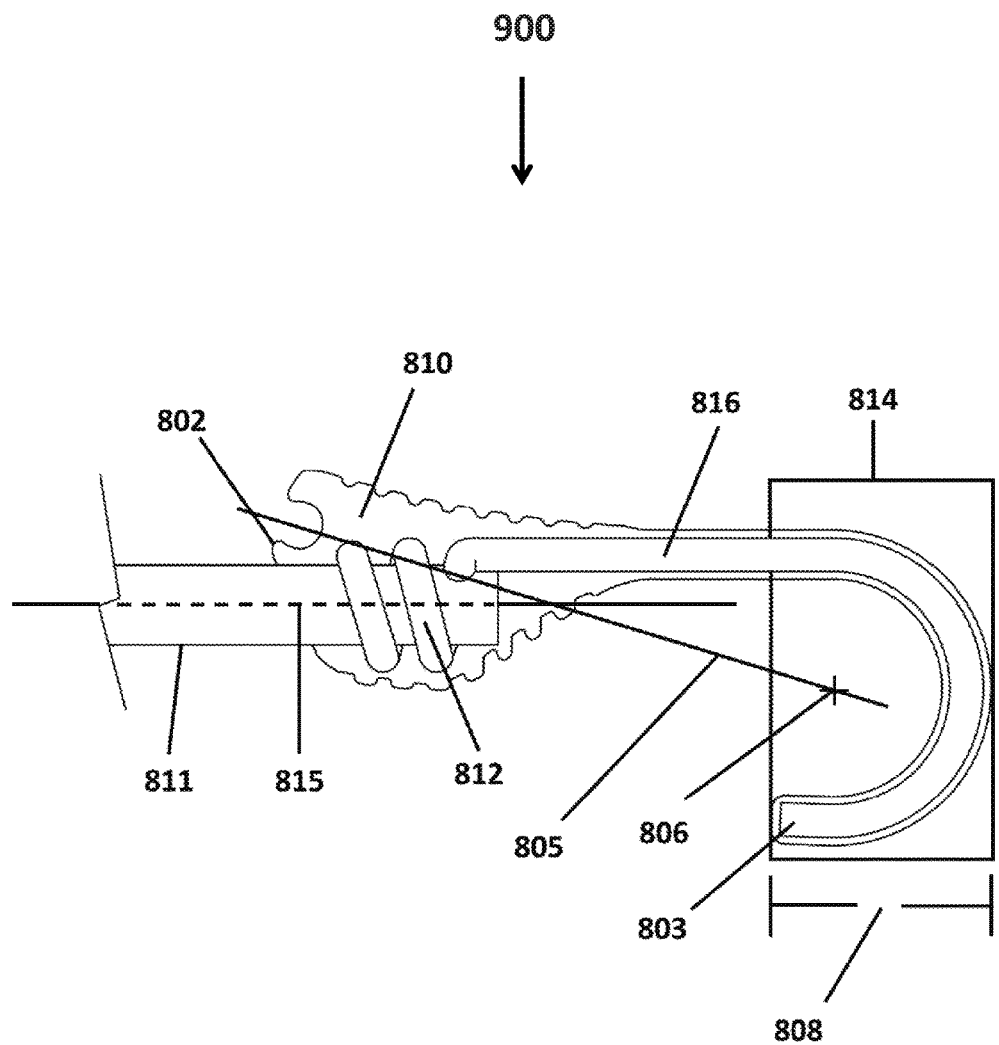
FIG. 24 is a side view partial cross-section of the third embodiment of the present invention.
Figure 25:
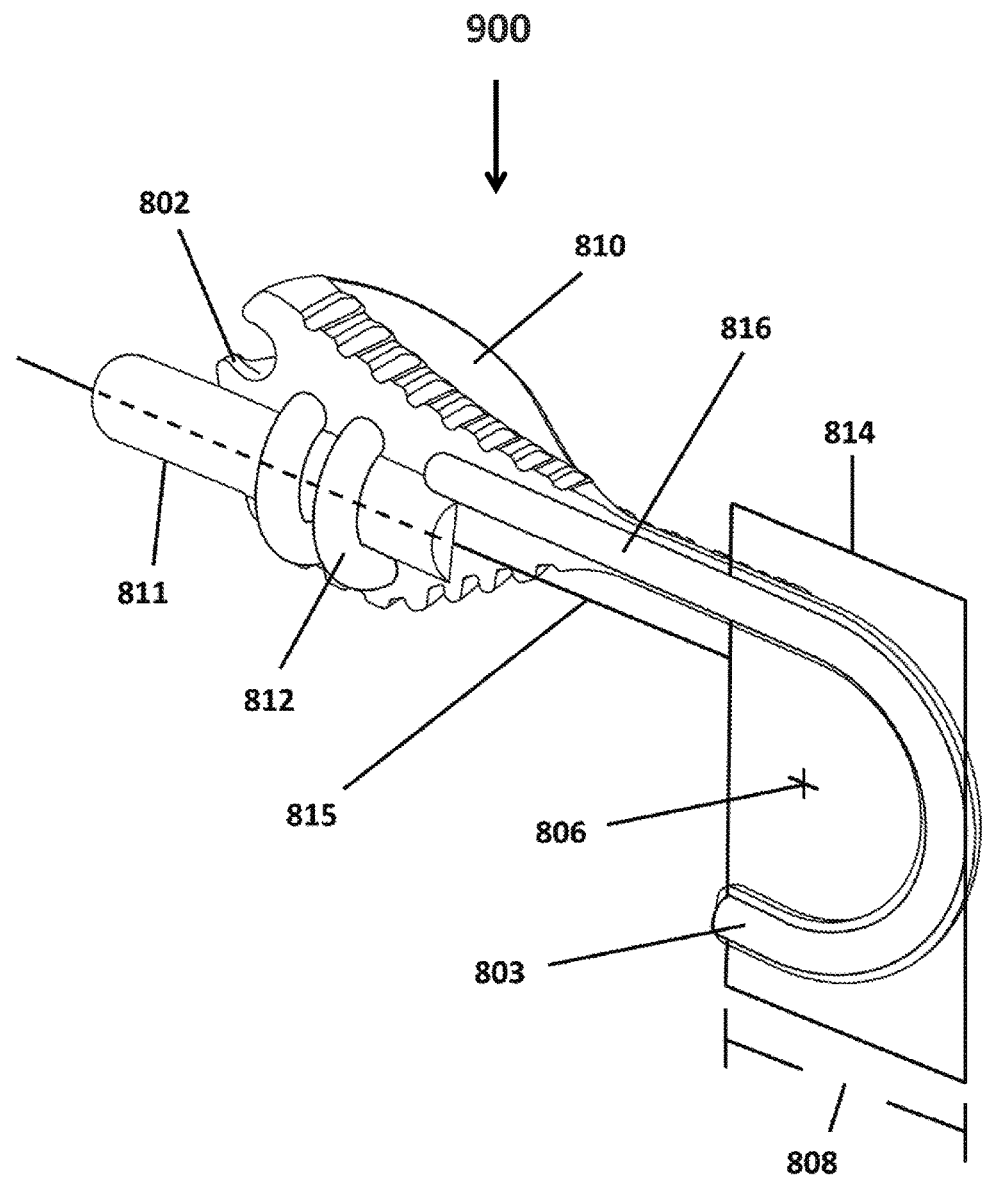
FIG. 25 is a partial cross-sectioned isometric perspective view of the third embodiment of the present invention.
Figure 28:
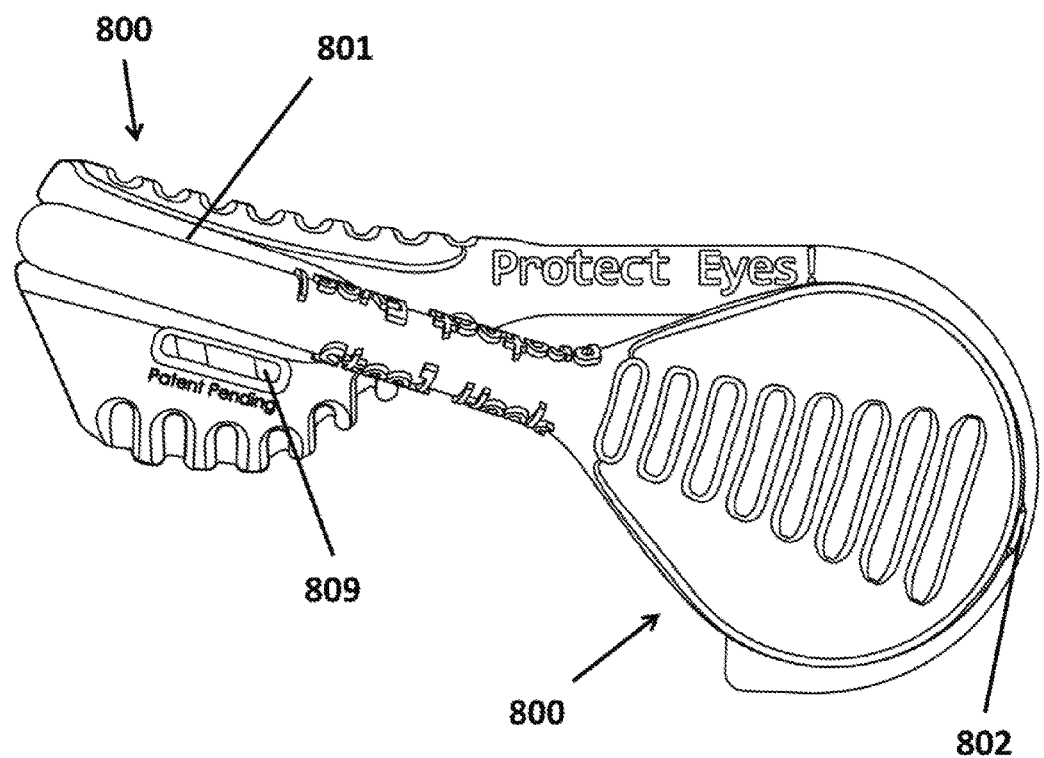
FIG. 28 is an isometric top view of the engaged assembly of the third embodiment of the present invention.

Interlocking hook device 800 (see FIG. 22) includes hook 808 with hook body 810, which provide the ability for two similar hook devices 800 to assemble and lock onto one another thereby forming a closed hook assembly. Interlocking hook devices 800 can be connected to an elastomeric or flexible elongated member 811 (see FIG. 28) which provides the ability for the hook devices 800 to assemble and lock onto one another thereby forming a closed hook assembly and thereby disabling the hooks and providing for tangle free transportation and storage when not in use.

Interlocking hooks devices 100 and 200 with strap 401 can be assembled by the following method:

First: Assembly of interlocking hook device 100.

Figure 8:
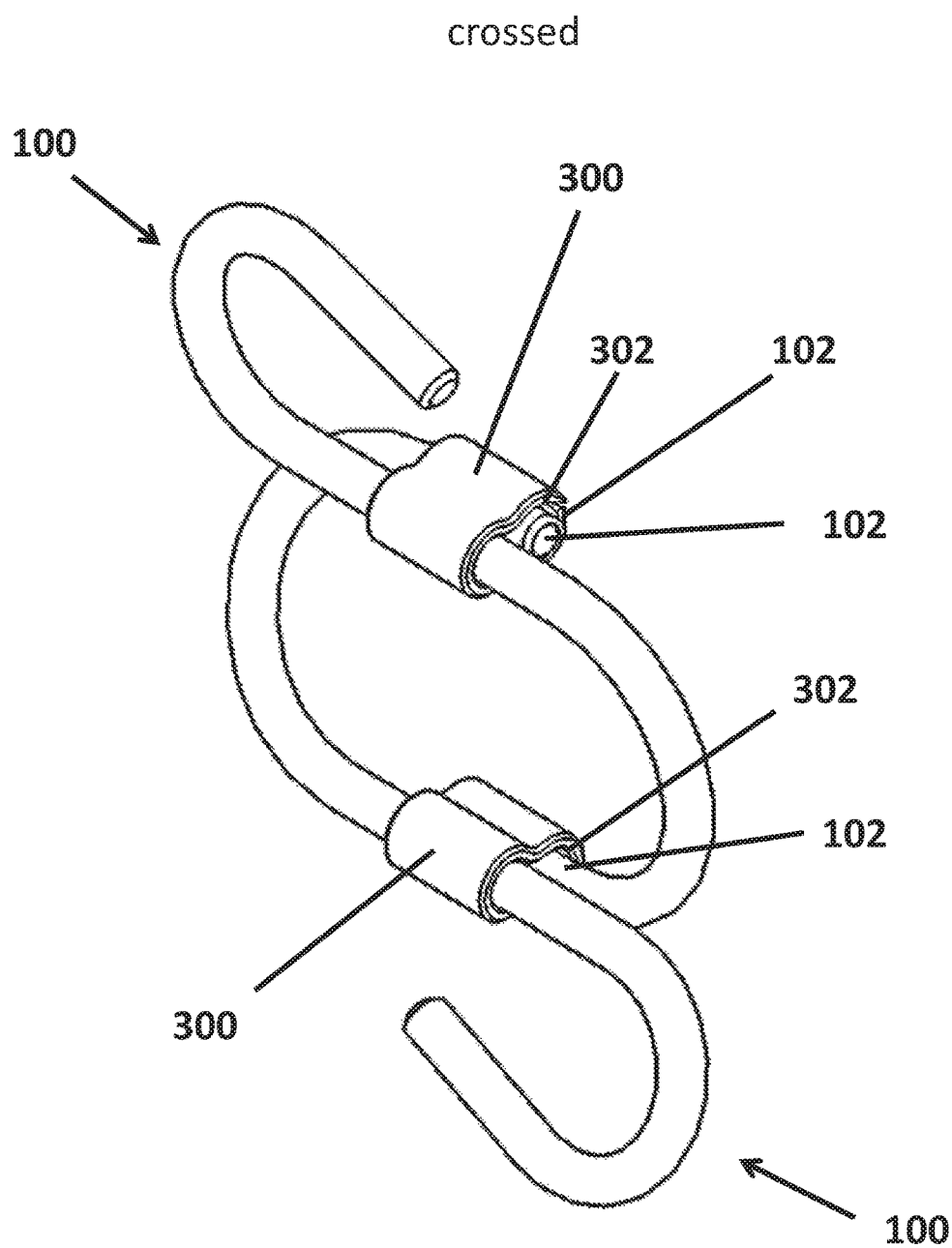
FIG. 8 is an isometric perspective view of the crossed engaged assembly of two similar hooks of the first embodiment of the present invention.

Hook assembly 100 begins with the forming of connector 300 which begins as a section of round tubing having a tab section made from slits which are cut through the tubing wall and bent inward to create a catch feature 304. Connector 300 with catch feature 304 is installed onto the hook 101 and located on the straight shank section 103 of hook 101. The tubing is then crimped to form the final shape, generally in the form of a FIG. 8 when viewed from the end, of connector 300 wherein two partial cylindrical sections are formed; the first cylindrical section 301 has a generally tight fit onto hook section 101 and the second cylindrical section 302 has a greater diameter than the hook wire to allow for a slip fit of the substantially straight front section 102 of hook 100 into cylindrical section 302 of connector 300. After the tubing is crimped into the final shape of connector 300 it is oriented in the straight section 103 of hook 101 such that the plane in which the axis of the two cylindrical sections of connector 300 lies generally perpendicular to the plane of the bend section 104 of hook 101. Connector 300 can then be spot welded (see 303 in FIG. 11) or crimped onto hook section 101.

Second: Assembly of interlocking hook 200.

Hook assembly 200 is assembled in the same manner as hook assembly 100 except that connector 300 is oriented on hook section 201 180 degrees relative to its position on hook assembly 100 (or approximately 180 degrees—it is preferred that it be offset enough to allow two devices 100 and 200 to hook together with a frictional fit or some other fit which provides a releasable lock of devices 100 and 200 together). Preferably the force to release the lock is sufficient such that once locked together, hook device 100 or 200 remains locked to the other hook device 100 or 200 until a user deliberately unlocks them. Connector 300 can also be formed integral with hook devices 100 and/or 200 or a single piece of tubing can be spot welded onto hook sections 101 and 201 to form a connector. Connector 300 can also have a secondary spring clip inserted in hole 302, an insert which reduces the inner diameter of hole 302, a stamped protrusion into the inner diameter of hole 302, all of which will proved for a locking frictional engagement of hook device 100 upon hook device 200.

Figure 9:
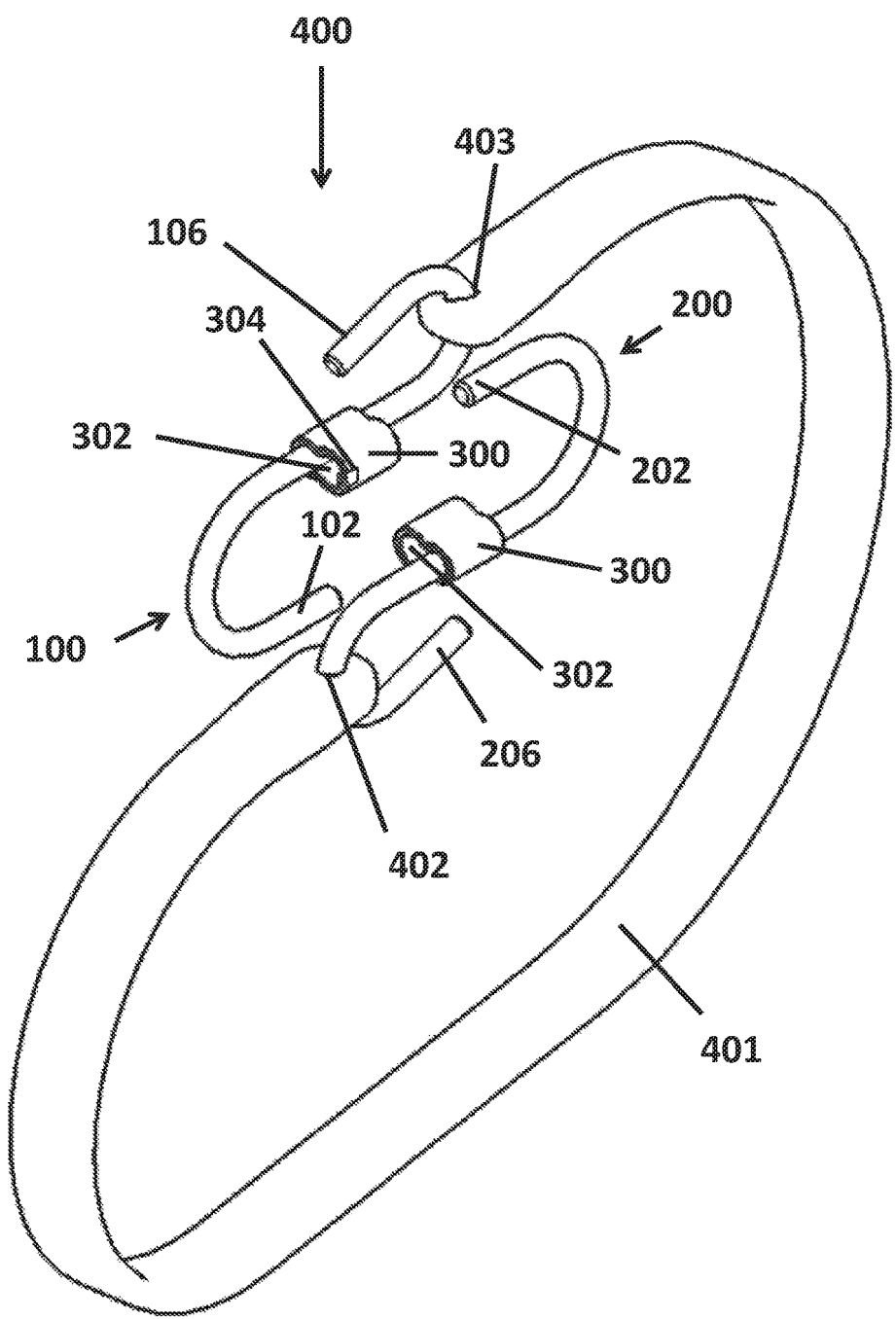
FIG. 9 is an isometric perspective view of the disengaged assembly of the first embodiment of the present invention with an elastic member.
Figure 10:
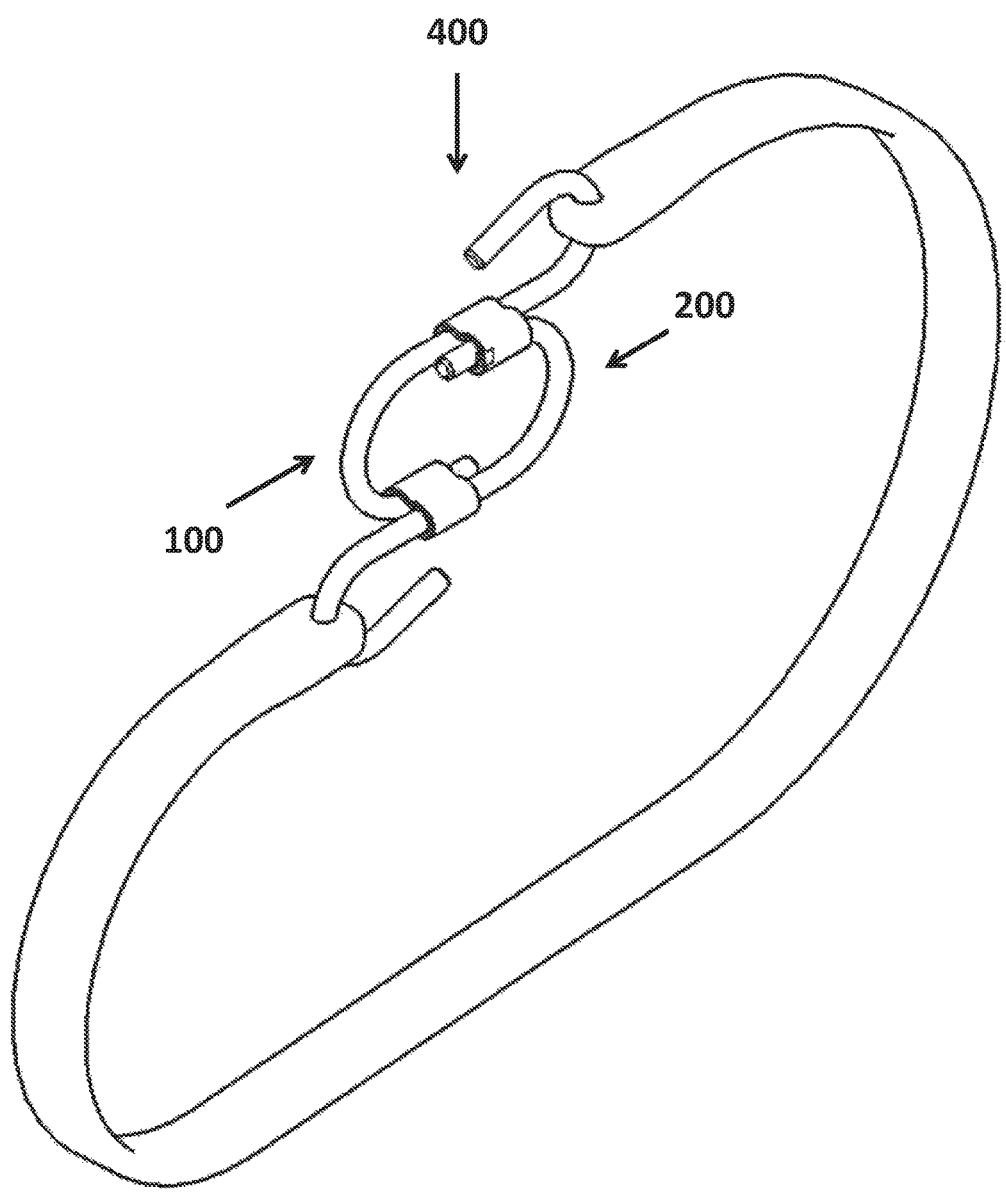
FIG. 10 is an isometric perspective view of the engaged assembly of the first embodiment of the present invention with an elastic member.

Third: Assembly of elastic member assembly 400 with interlocking hook assemblies 100 and 200 (see FIG. 9).

First, elastic member 401 is assembled by installing straight section 106 of hook device 100 into hole 403 of elastic strap 401 and centering hole 403 in the center of bend section 105 of hook 100. Second, straight section 206 of hook device 200 is installed into hole 402 of elastic member 401 and then hole 402 is centered in the middle of bend section 205 of hook device 200.

Fourth: Assembly of elastic member assembly 500 with interlocking hooks 100.

First, elastic member 501 is assembled by installing straight section 106 of first hook 100 into hole 503 of elastic strap 501 and centering hole 503 in the center of bend section 105 of hook device 100. Second, straight section 106 of a second hook device 100 is installed into hole 502 of strap 501 and then hole 502 is centered in the middle of bend section 105 of second hook 100 device.

Fifth: Construction of hook assembly 600.

Hook assembly 600 can be constructed of a solid over-molded steel core over-molded with Polypropylene, Polycarbonate, Polyethylene or Nylon with inner steel core hook made from steel wire (high carbon spring wire (music wire ASTM A 228 or hard drawn ASTM A 227) formed in the shape of a hook device 600 including hole 602 and connector groove 601).

Sixth: Assembly of elastic member assembly 700 with interlocking hook device 600.

Elastic member 700 is assembled by installing hook device 600 onto each end of elastic cord 701 and fixedly attaching the ends of cord 601 into hole 602 of hook device 600.

Seventh: Construction of hook assembly 800.

Hook assembly 800 can be constructed of a solid over-molded steel core over-molded with Polypropylene, Polycarbonate, Polyethylene or Nylon with inner steel core hook 803 made from high carbon spring wire (music wire ASTM A 228 or hard drawn ASTM A 227) formed in the shape of a hook 808 including coil section 812 and having a connector groove 801 and a catch feature 802. Catch feature 802 consists of protrusions within the upper and lower portions of groove 801 wherein the protrusions have a span between each end which is shorter than the span across the mating section of hook 808. Catch feature 802 can also wrap around all or a portion of the upper and lower circumference of connector groove 801. Catch feature 802 can wrap around all or a portion of the upper or lower section of connector groove 801. Catch feature 802 can be constructed of a separate and flexible metal or plastic insert which can be fixedly attached to or within the engagement groove and which will have an opening with a smaller gap than the cross-sectional area of the mating hook section to provide for a locking engagement of one hook assembly 800 to another hook assembly 800. Two hook assemblies 800 can also be locked by means of a magnet embedded in hook body 810 at the center of the engagement groove wherein the magnet will provide a magnetic attraction to wire core 803 thereby preventing the release of one hook 800 from the other until the user applies sufficient force to overcome the magnetic attraction thereby releasing the hooks.

Eighth: Assembly of elastic member 811 and interlocking hook assembly 800

Figure 26:
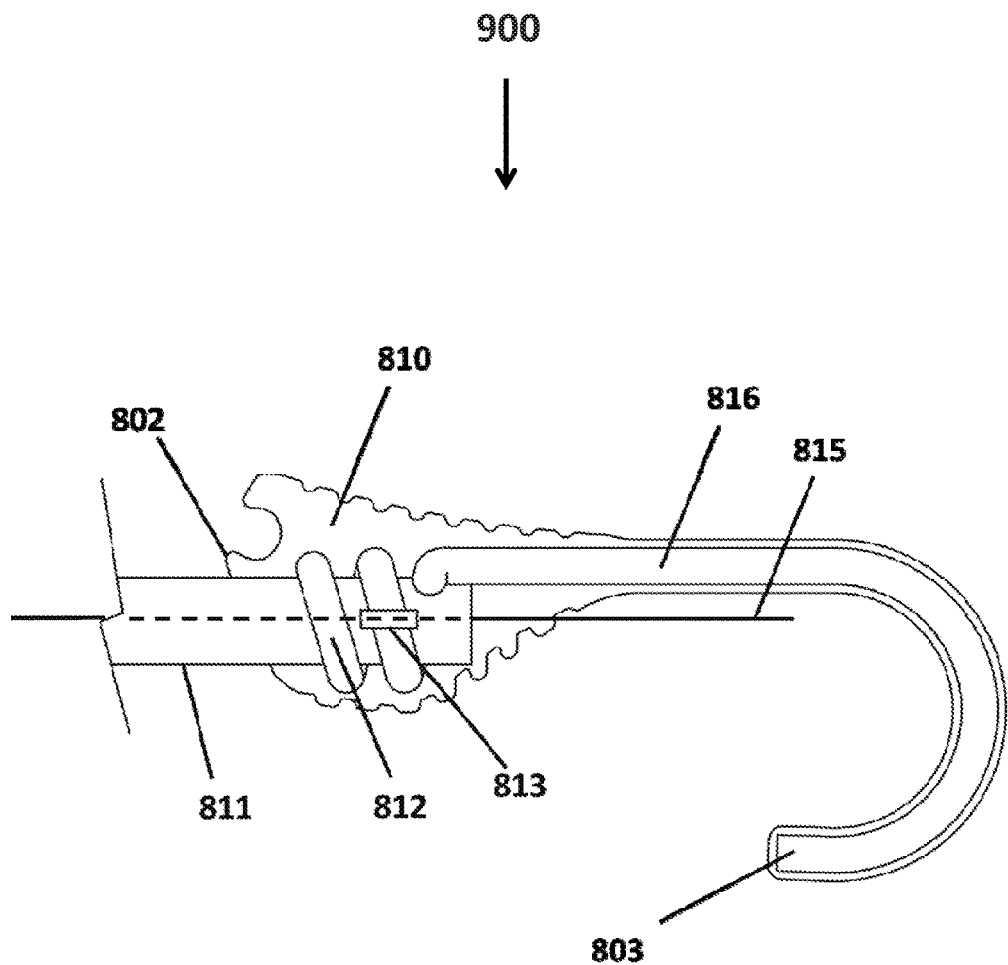
FIG. 26 is a side view cross section of the third embodiment of the present invention.
Figure 27:
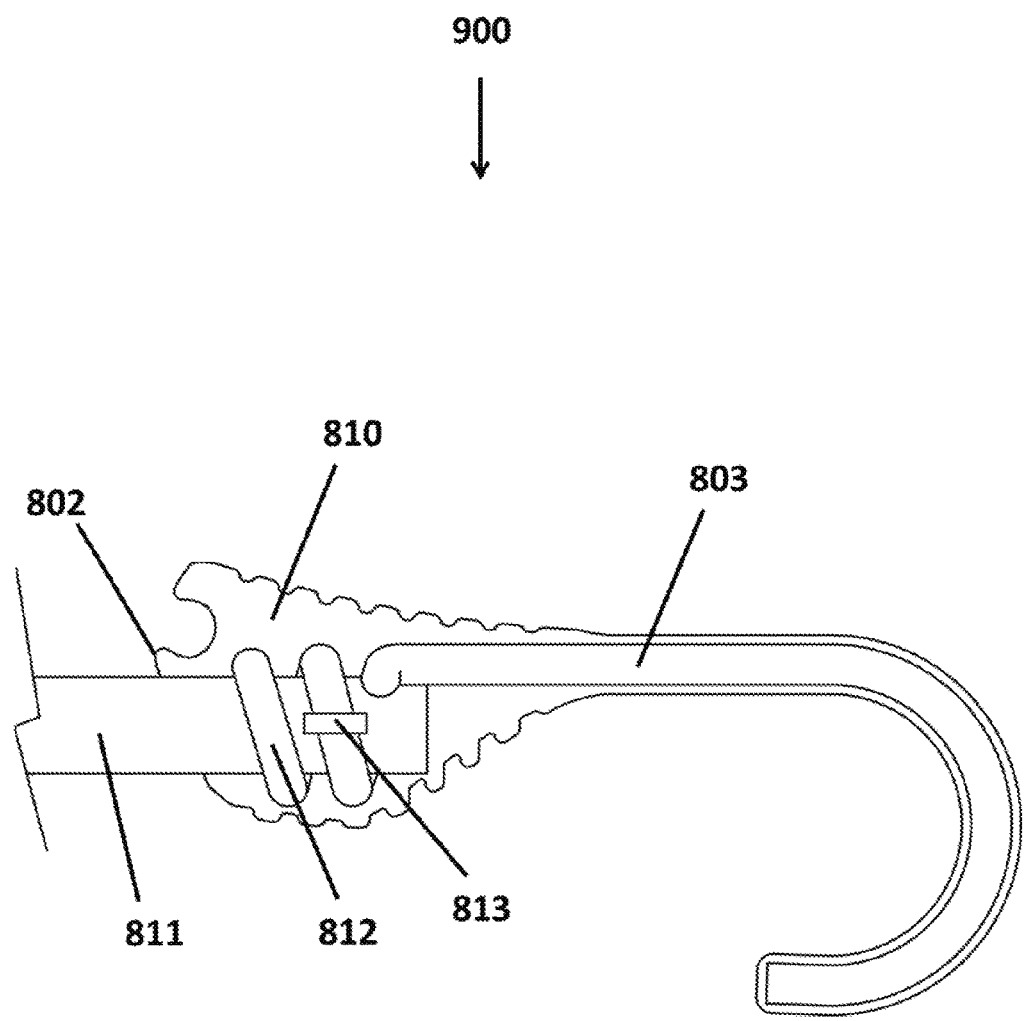
FIG. 27 is an isometric perspective view of the engaged assembly of the third embodiment of the present invention.

First, the coil sections 812 of a first and second steel hooks 803 are installed onto each end of elastic member 811 by means of screwing or pressing coil section 812 over elastic member 811 which has a slightly larger outer diameter than the inner diameter of coil section 812. An optional staple 813 having leg lengths approximately the same as the cross-sectional distance across the coil section 812 can be inserted over a section of the wire coil section 812 and through elastic member 811 (see FIG. 26). An insert molding process is employed by inserting and centralizing first and second steel hooks 803 and elastic member 811 and staple 813 assemblies into a first and second mold cavity in a first half of an injection molding block. The second half of the injection molding block is clamped upon the first half forming two closed cavities in the shape of hook device 800 surrounding the assemblies of steel hooks 803 and elastic member 811 within. Polypropylene, polycarbonate, polyethylene or nylon or other thermoplastic polymer is then injected into the two mold cavities thereby completing the inserting molding process and the construction of elastic member and hook assembly 900. Hook assembly 800 with steel hook 803 can also be molded separately by inserting and centralizing steel hooks 803 into a mold cavity of a first half of an injection molding block. The second half of the injection molding block is clamped upon the first half forming a closed cavity in the shape of hook device 800 surrounding the assembly of steel hooks 803 within. Polypropylene, polycarbonate, polyethylene or nylon or other thermoplastic polymer is then injected into the mold cavity thereby completing the inserting molding process and the construction of hook 800. Each end of elastic member 811 can be installed into hole 807 of two hook assemblies 800 and elastic member 811 can then be fixedly attached to each hook assembly 800 by means of a staple 813 being inserted through the attachment means access port 809 and straddling a coil of coil section 812 wherein, the legs of the staple will preferably be of sufficient length to be at least as long as the cross-sectional width of coil section 812. Also, access port 809 can be used for the insertion of a pin between the coils of coil section 812 and through the elastic member 811 and/or for a secondary operation of injecting a thermoplastic, epoxy or other adhesive to secure elastic member 811 to hook 800. Access port 809 may also serve as a means of reducing the volume of plastic in hook body 810 thereby assisting cooling of the thermoplastic thereby reducing shrinkage of the thermoplastic hook body 810.

Figure 13:
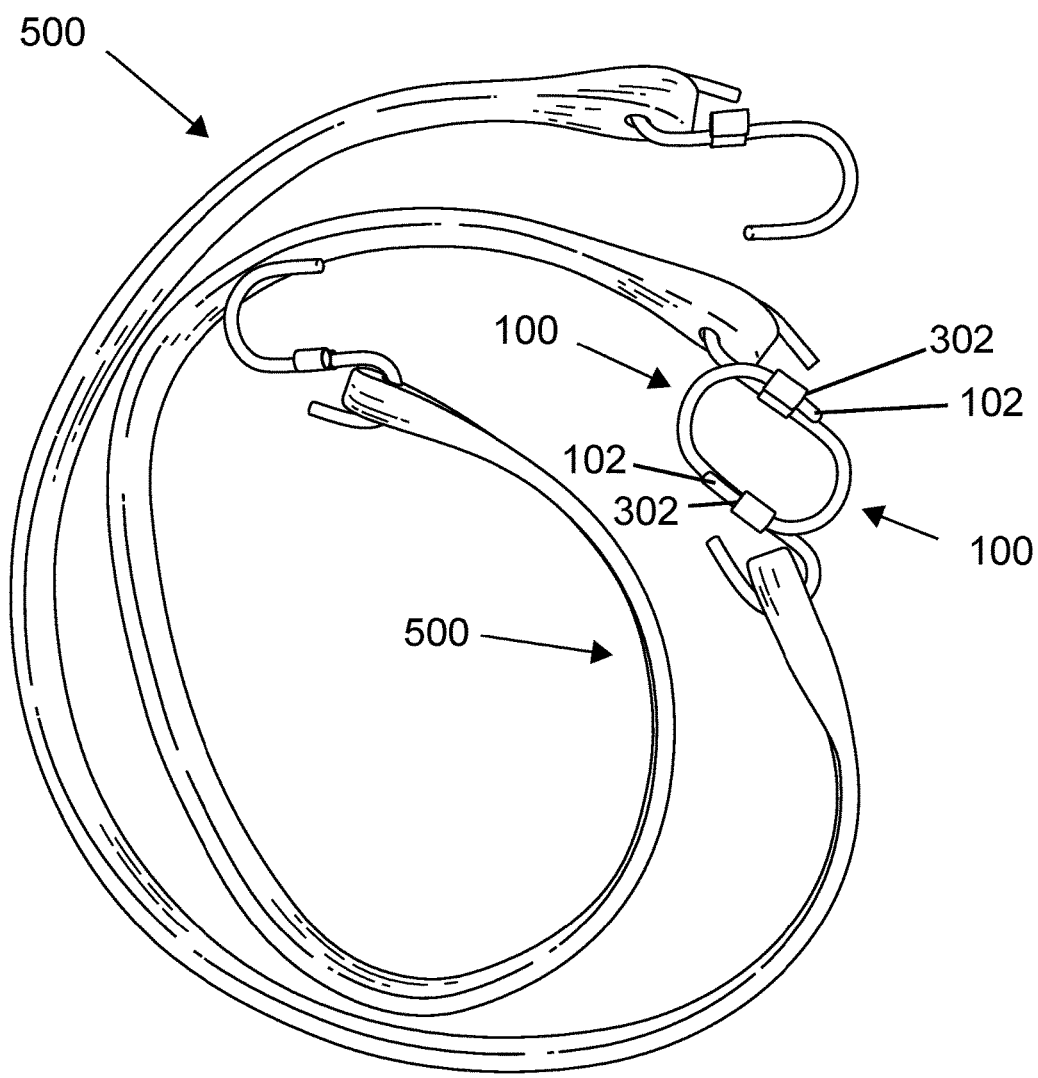
FIG. 13 is a side view of the first embodiment of the present invention showing two elastic member connected end-to-end.
Figure 14:
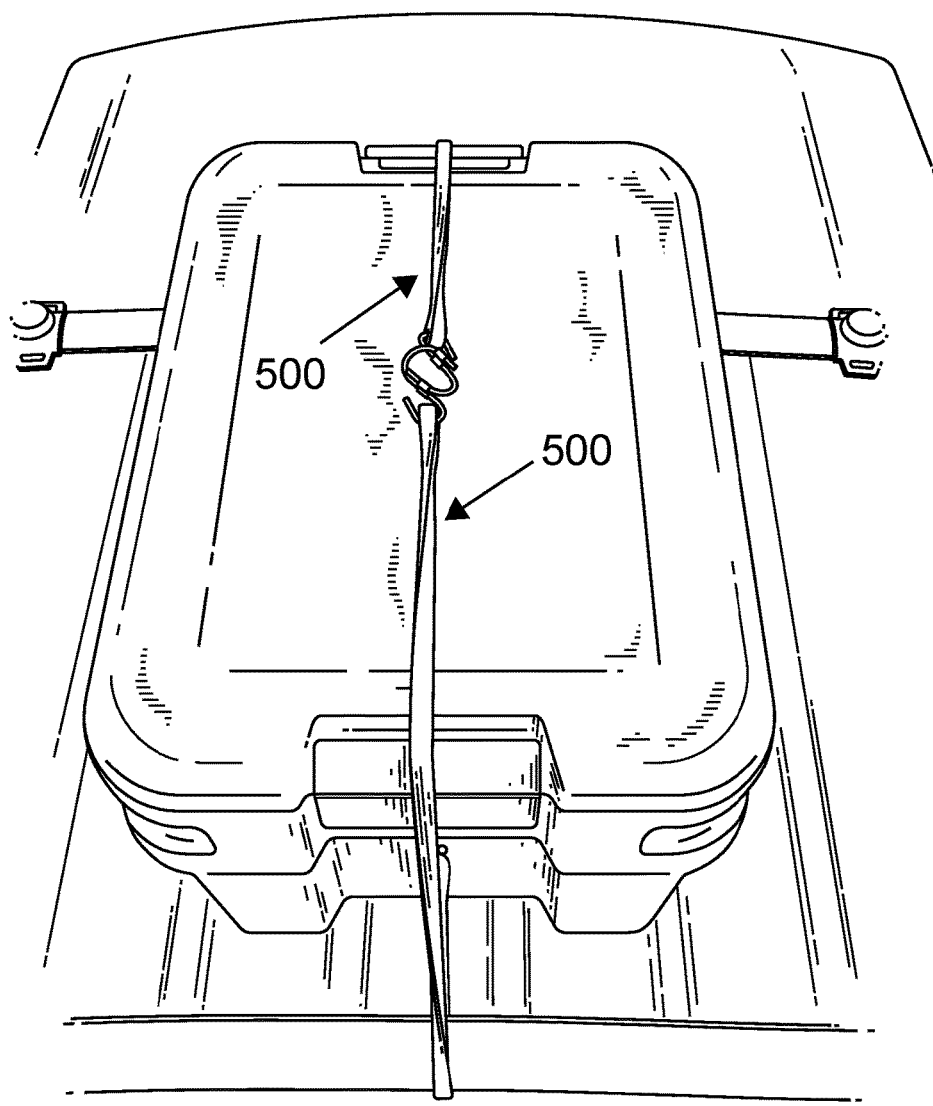
FIG. 14 is a top view of the first embodiment of the present invention with elastic strap securing cargo.

How the elastic member 400 assembly with interlocking hook devices 100 and 200 work:

Elastic member 400 with interlocking hook devices 100 and 200 work by installing straight section 102 into hole 302 of hook 200 and installing straight section 202 into hole 302 of hook device 100 thereby forming a closed hook assembly. The catch feature 304 is a tab which is bent inward to reduce the diameter of cylindrical section 302 of connector 300 and provides a spring load effect to frictionally retain straight sections 102 and 202 of hook devices 100 and 200 respectively within cylindrical section 302. Multiple elastic straps 400 with interlocking hook devices 100 and 200 can also be assembled and locked into an elongated series by installing straight section 102 into hole 302 of first hook device 100 on one end of a first elastic member assembly 400 and then installing straight section 102 into hole 302 of a second elastic member assembly 400 onto the second hook 200 of first elastic member assembly 400 thereby forming a closed loop assembly of hooks 100 and 200 in the center of the elongated series while having open hooks 101 and 201 on each end (see FIGS. 13 and 14).

Figure 11:
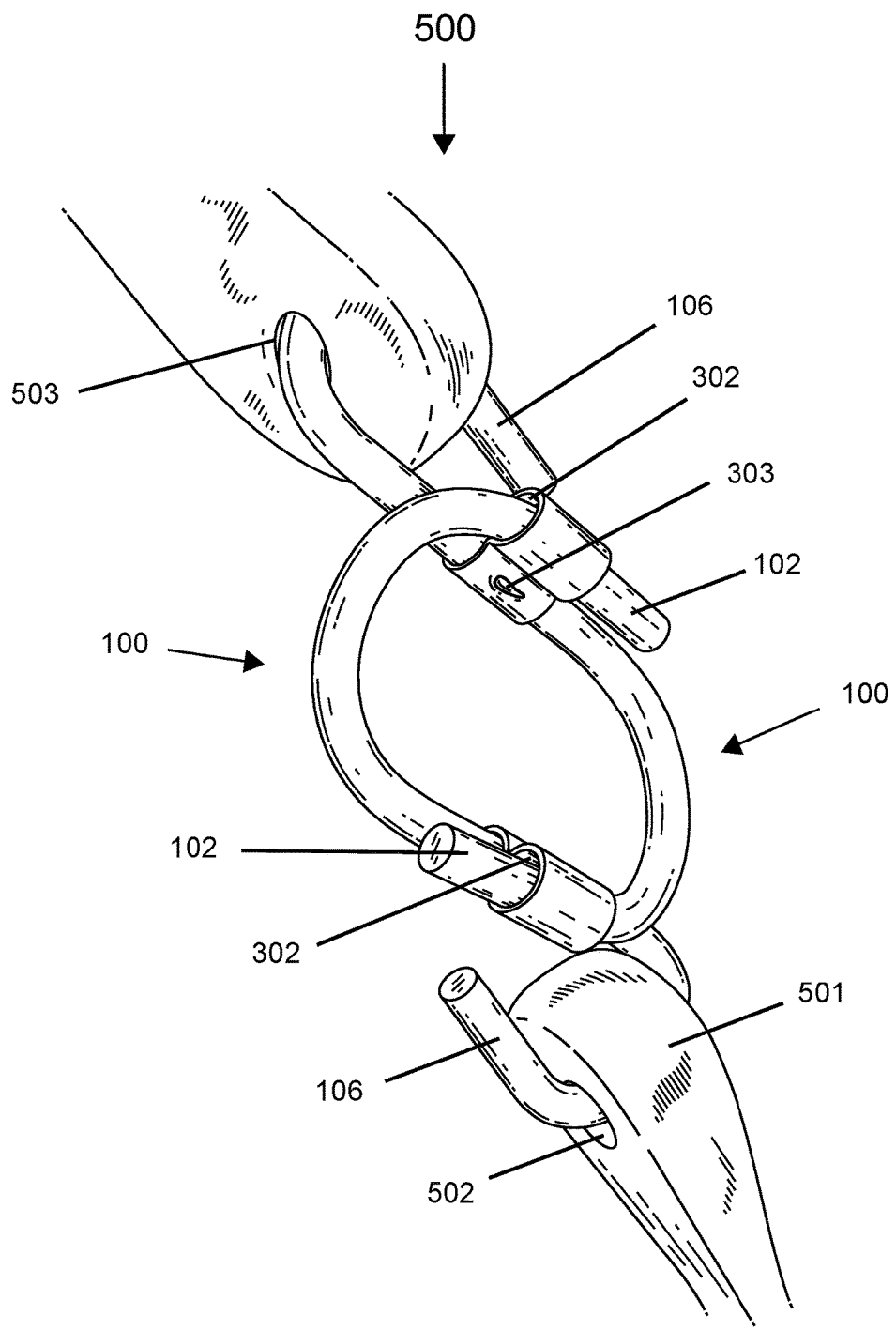
FIG. 11 is a an isometric perspective view of the first embodiment of the present invention showing two bungee cords connected end-to-end.

How the elastic member 500 assembly with interlocking hook devices 100 assembly work:

Elastic member assembly 500 with interlocking hook devices 100 work by installing straight section 102 into hole 302 of first hook device 100 and installing straight section 102 into hole 302 of second hook device 100 thereby forming a closed loop assembly (see FIG. 11). Multiple elastic member assemblies 500 with interlocking hook devices 100 can also be assembled and locked into an elongated series by installing straight section 102 into hole 302 of first hook device 100 on one end of a first elastic member assembly 500 and then installing straight section 102 into hole 302 of a second elastic member assembly 500 onto the second hook of first elastic member assembly 400 thereby forming a closed hook assembly of hook devices 100 in the center of the elongated series while having open hooks 101 on each end (see FIGS. 13 and 14).

Figure 17:
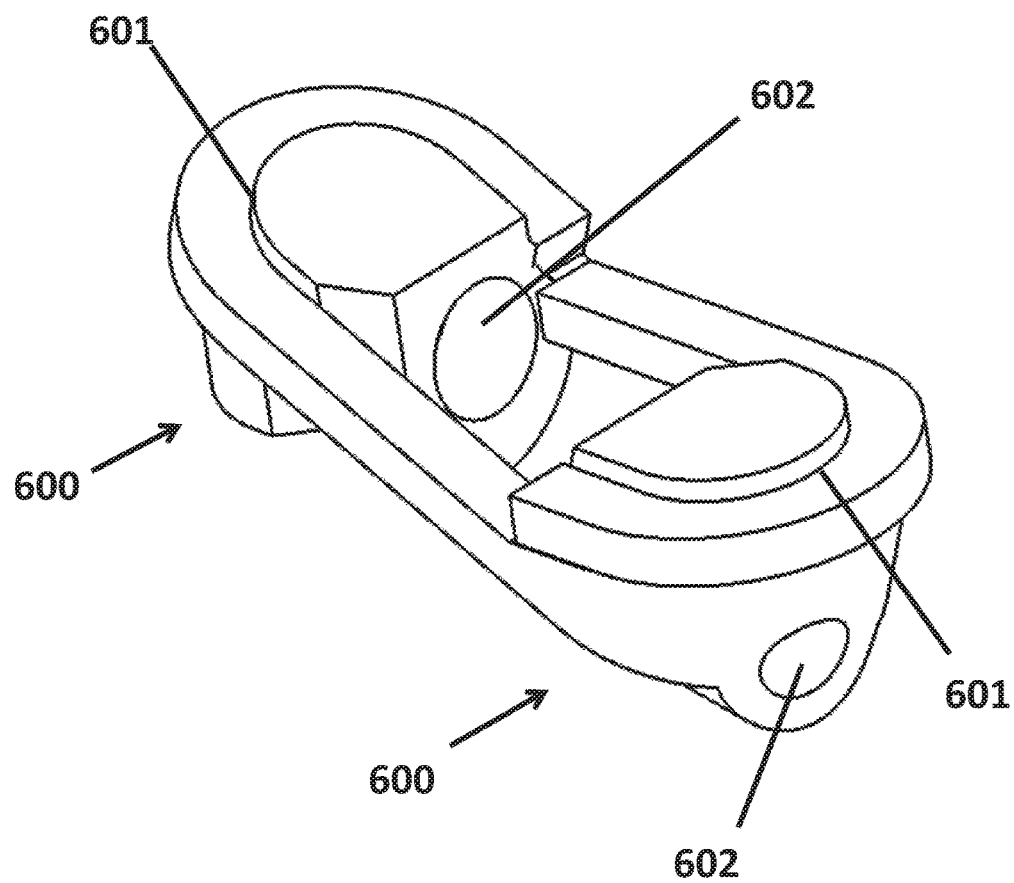
FIG. 17 is an isometric perspective view of the engaged assembly of the second embodiment of the present invention.
Figure 18:
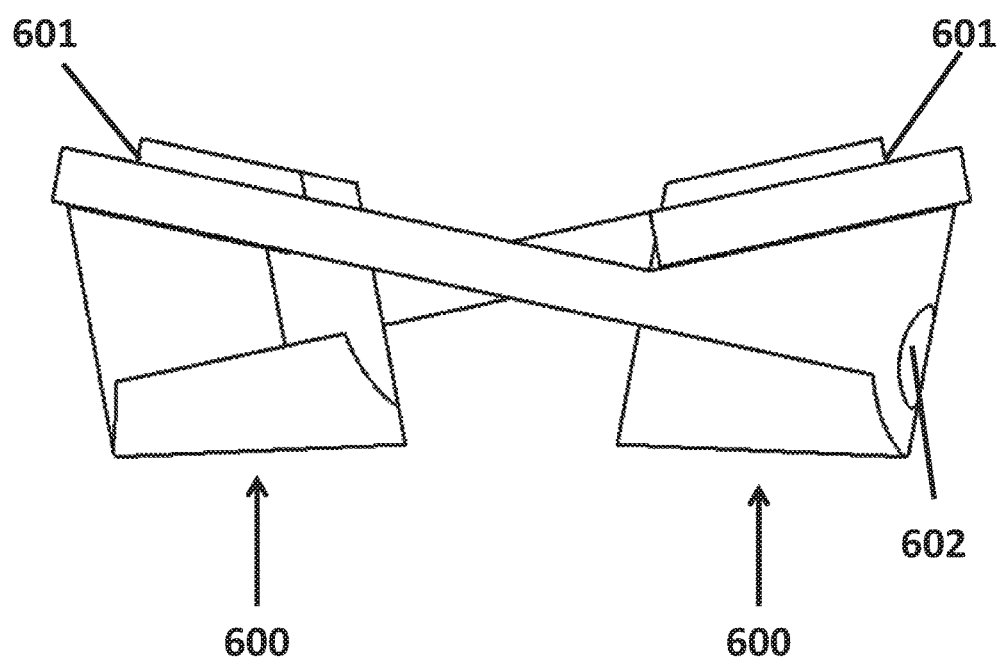
FIG. 18 is a side view of the engaged assembly of the second embodiment of the present invention.

How the elastic member assembly 700 with interlocking hook devices 600 works:

Elastic member assembly 700 with interlocking hook devices 600 work by engaging two hook devices 600 on each end of elastic member 701 together by engaging hook 603 into groove 601 of each hook respectively as shown in FIG. 17. Multiple elastic members 700 with interlocking hook devices 600 can be assembled and locked into an elongated series by engaging hook 603 into groove 601 of hook devices 600 of a first and second elastic member thereby forming closed hook assemblies of hook devices 600 in the center of the elongated series while having open hooks 603 on each end.

Figure 29:
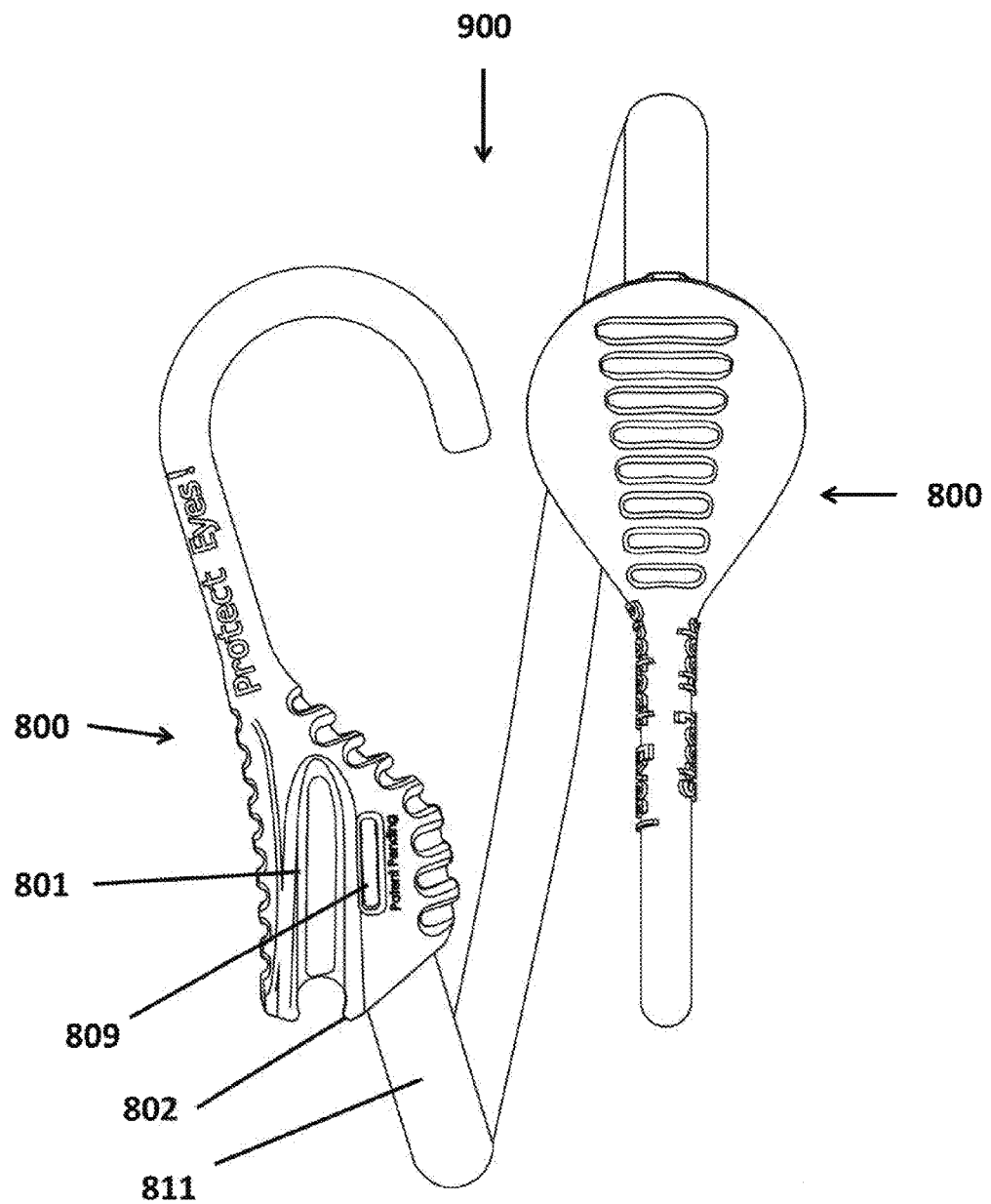
FIG. 29 is an isometric perspective view of the disengaged assembly of the third embodiment of the present invention with an elastic member.
Figure 30:
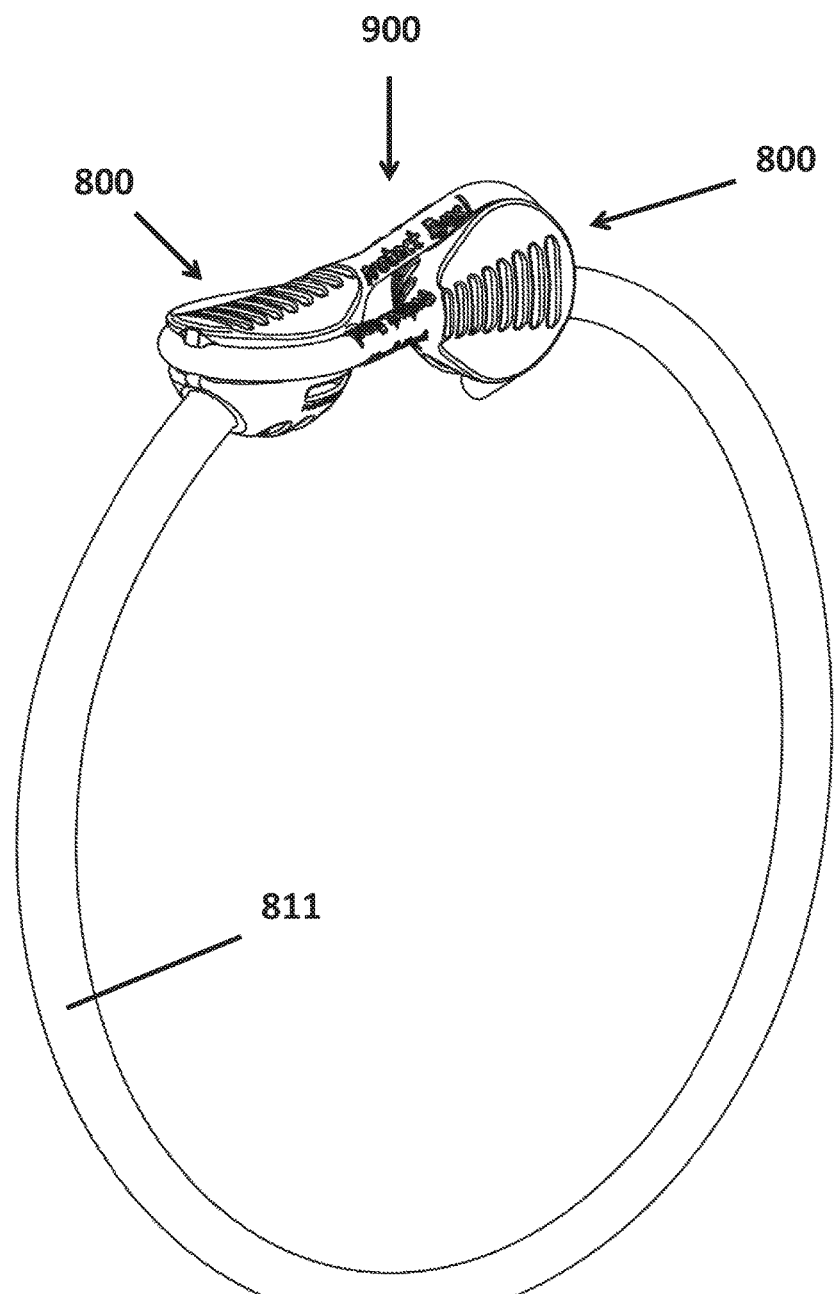
FIG. 30 is a perspective side view of the engaged assembly of the third embodiment of the present invention.
Figure 31:
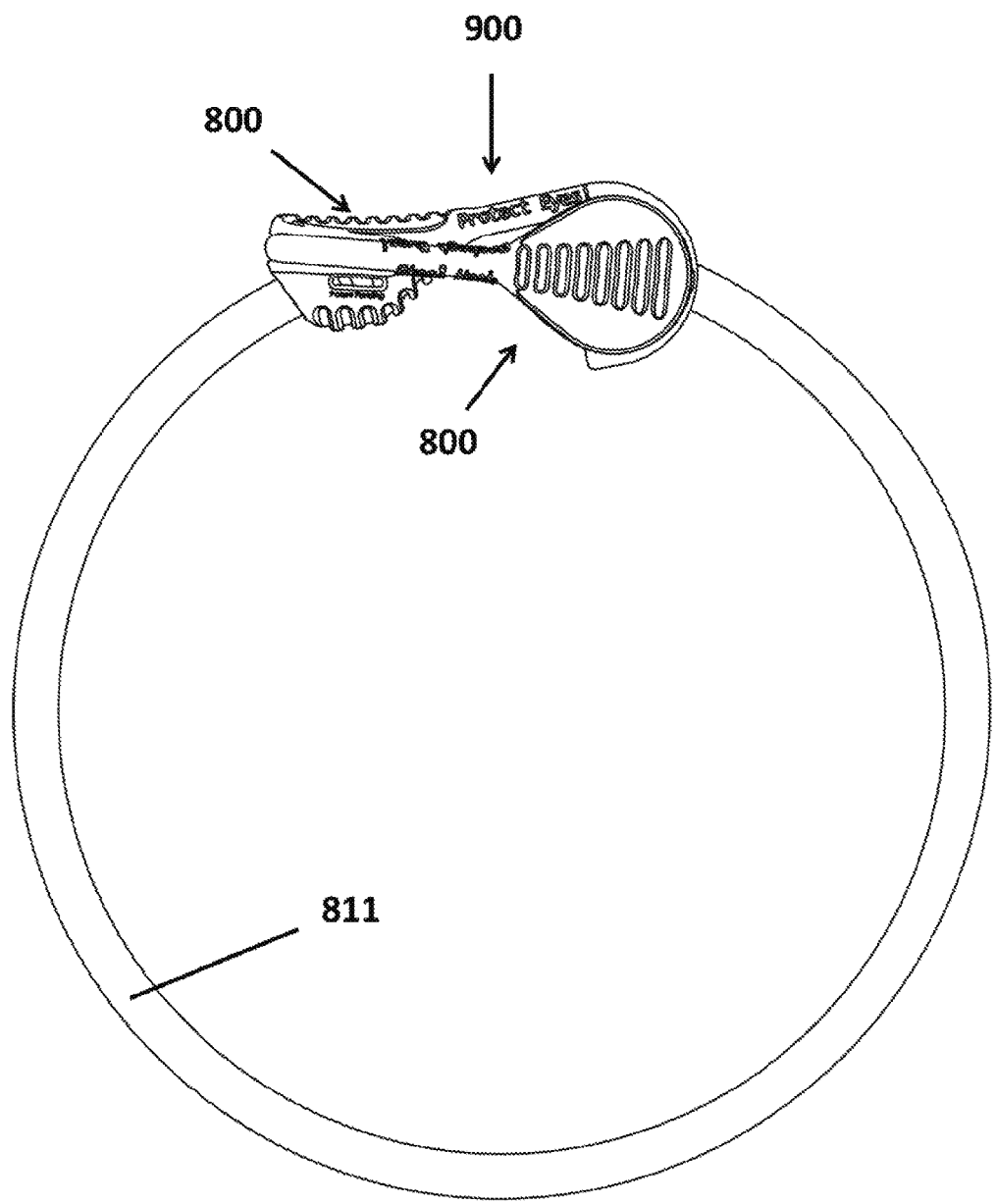
FIG. 31 is a side view of the engaged assembly of the third embodiment of the present invention.
Figure 32:
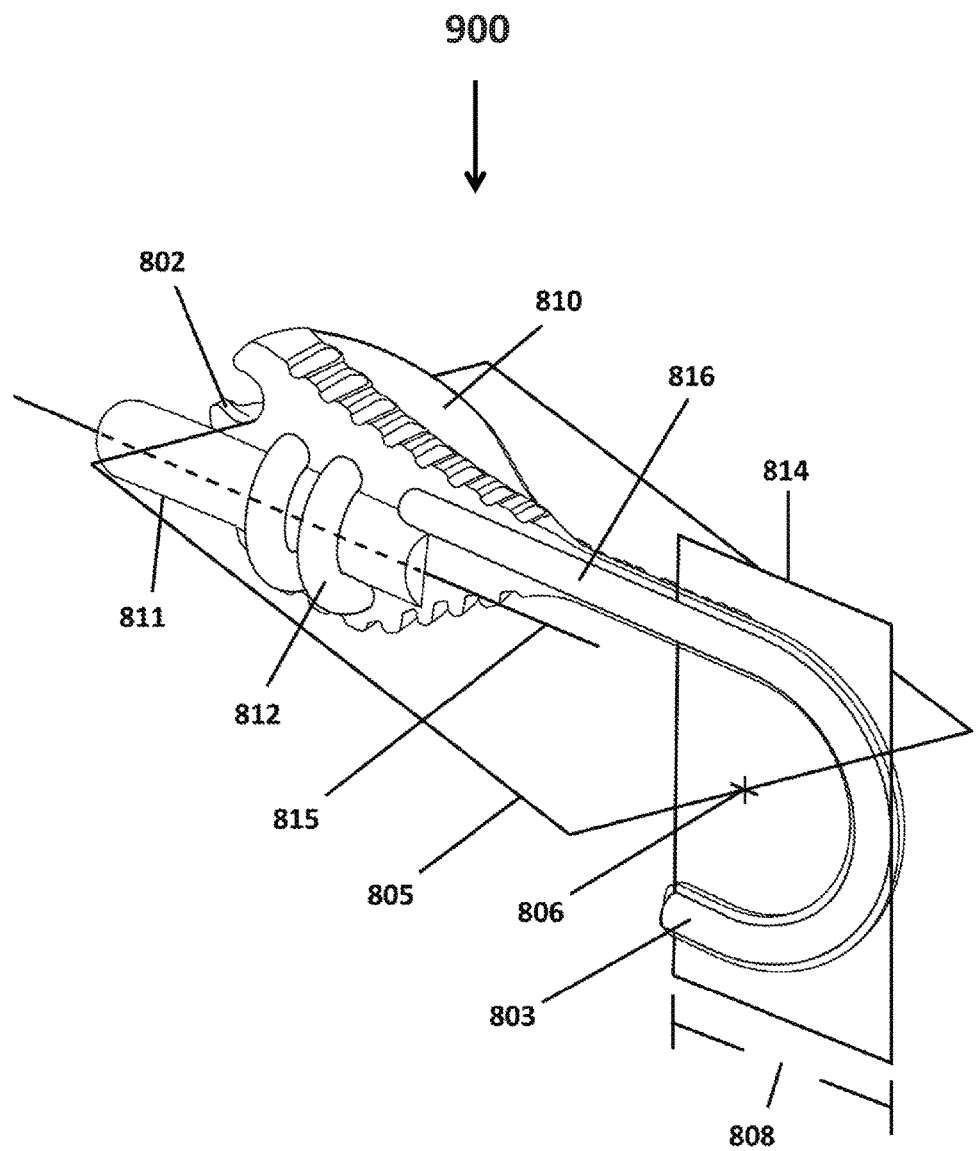
FIG. 32 is a partial cross-sectioned isometric perspective view of the third embodiment of the present invention.

How the elastic member and interlocking hook assembly 900 works:

Elastic member assembly 900 with interlocking hook devices 800 work by engaging two hook devices 800 on the ends of elastic member 811 together by engaging hook 808 into groove 801 of each hook device 800 respectively as shown in FIG. 29. The catch feature 802 having a smaller cross-sectional area than the mating section of hook 800 flexes to allow the hook 808 of hook device 800 to pass between the catch feature protrusion thereby allow each hook 808 to have snap-locking engagement into groove 801 of each hook device 800 respectively. Multiple elastic cords 900 with interlocking hook devices 800 can be assembled in an elongated series by engaging hook 808 into groove 801 of hook devices 800 of a first and second elastic member and interlocking hook assembly 900 thereby forming closed hook assemblies of hook devices 800 in the center of the elongated series while having open hooks 808 on each end.

As can be seen in the drawings, the diameter of the hook 808 is approximately equal to the diameter of the hook body 810. This allows the hook 800 to be large enough to engage larger diameter items than would otherwise be possible.

Each hook 808 locks into the groove 801 of the other hook device 800, preferably frictionally (though they could for example have a spring loaded or magnetic lock). Preferably, each hook 808 frictionally engages the other hook device 800 or somehow releasably locks to the other hook device 800. Preferably the force to release the lock is sufficient such that once locked together, hook 808 remains locked to the other hook device 800 until a user deliberately unlocks them.

Figure 12:
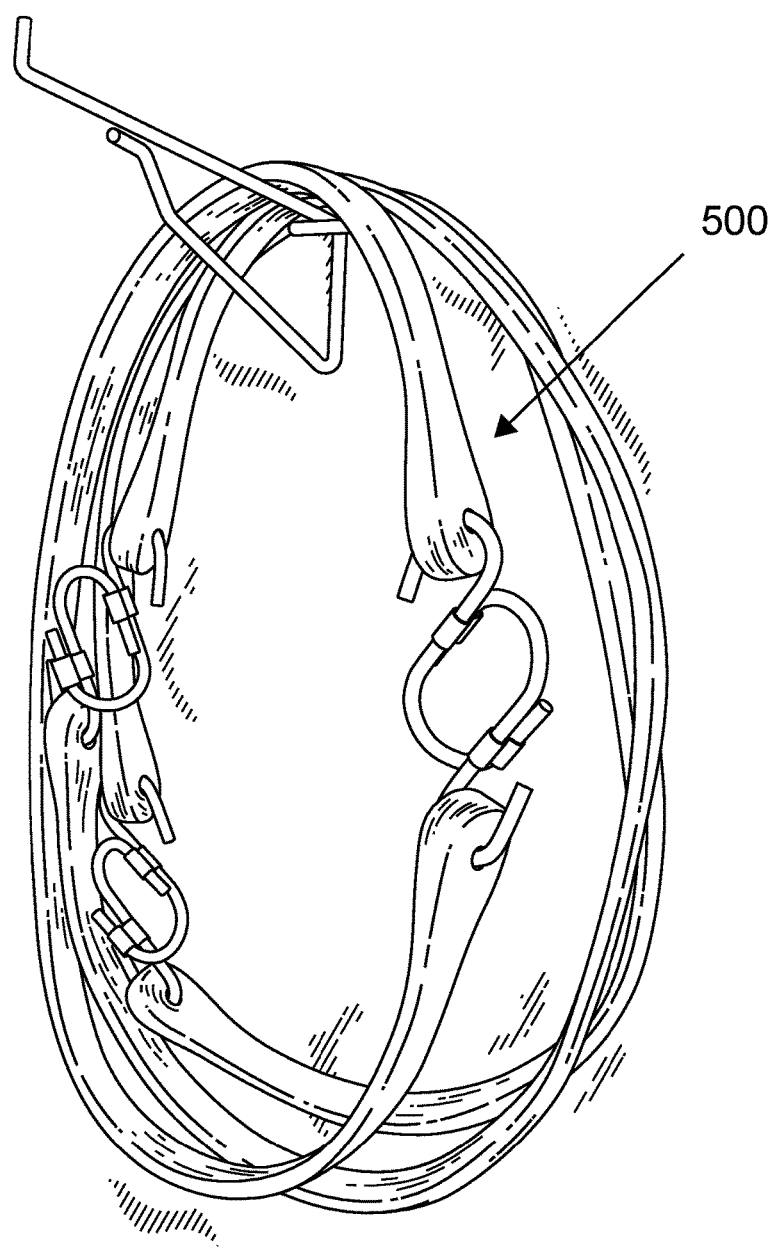
FIG. 12 is an isometric perspective view of the first embodiment of the present invention in storage.

The interlocking hooks with elastic and rigid cords and straps are advantageous over other elastic and rigid cord and straps with hooks in the following ways:

Novel features of the present invention include a pair of interlocking hooks with a catch feature which can form a closed and locked hook assembly by engaging one hook upon the other in a manner such that none of the sections of the hook are exposed to engage on other objects when the hooks are not intended for use. Second, in the first embodiment of the present invention using hook devices 100 and 200, locating the offset connector 300 with catch feature 304 outside of the bend section 104 and 204 of hook devices 100 and 200 respectively is advantageous over other designs because there are no objects attached to the bend section 104 or 204 of hook devices 100 and 200 which would interfere with the function of the hook devices when in use. Third, in the first, second and third embodiments of the present invention when hook devices 100 and/or 200 or 600 or 800 are used on each end of an elastic member (such as elastic members 400, 500, 700 or 900) the hook devices 100 and/or 200, 600 or 800 can be connected to one another in a manner such that the elastic member 400, 500, 700 or 900 are connected end-to-end with the hook devices 100 and/or 200, 600 or 800 forming a closure upon one another thereby preventing engagement of other objects and providing for tangle free storage and transportation when not in use (see FIG. 12).

Fourth, in the second embodiment of the present invention using hook device 600, locating the connector groove 601 in the hook body provides for a pair of interlocking hooks of the molded reinforced plastic type which can form a closed hook assembly by engaging one hook upon the other in a manner such that none of the sections of the hook are exposed to engage on other objects and providing for tangle free storage and transportation when the hooks are not in use. Fifth, in the third embodiment of the present invention using hook device 800, locating the connector groove 801 with catch feature 802 in the hook body 810 provides for a pair of interlocking hooks of the molded reinforced plastic type which can form a closed and locked hook assembly by engaging one hook upon the other in a manner such that none of the sections of the hook are exposed to engage on other objects and providing for tangle free storage and transportation when the hooks are not in use. Sixth, in both the first, second and third embodiments of the present invention, multiple elastic and rigid cords and straps 400, 500, 700 and 800 can be joined and locked end-to-end to extend same while providing closed central hooks in the center of the extended elastic or rigid cords and straps with open hooks on each end to engage upon desired objects.

A flexible elongated member could include one hook device 100 and one hook device 200, or two hook devices 100 or two hook devices 200.

A flexible elongated member could include two hook devices 600 or two hook devices 800.

PARTS LIST

The following is a list of exemplary parts and materials suitable for use in the present invention:

100 Interlocking hook device (preferably made of made of stainless steel, but can also be made of carbon steel (high carbon spring wire—music wire ASTM A 228 or hard drawn ASTM A 227) which can be coated with a various finishes, including Plastic, Zinc, Chrome, Nickel, Nylon, Brass, Epoxy, Teflon, Halar etc.)
101 hook
102 Straight front section of hook 100 from the end of the hook to the start of the bend section 104

103 Straight shank section of hook 100 defined as the section between the bend section 104 and bend section 105
104 Bend section defined as the section of the hook between the straight shank section 103 and the straight front section 102
200 Interlocking hook device (preferably made of made of stainless steel, but can also be made of carbon steel (high carbon spring wire—music wire ASTM A 228 or hard drawn ASTM A 227) which can be coated with a various finishes, including Plastic, Zinc, Chrome, Nickel, Nylon, Brass, Epoxy, Teflon, Halar, Vinyl etc.)
201 Hook
202 Straight front section of hook 200 from the end of the hook to the start of the bend sections 204
203 Straight shank section of hook 200 defined as the section between the bend section 204 and bend section 205
204 Bend section defined as the section of the hook between the straight shank section 203 and the straight front section 202
300 Connector (preferably made of made of stainless steel, but can also be made for example of carbon steel which can be coated with a various finishes, including Plastic, Zinc, Chrome, Nickel, Nylon, Brass, Epoxy, Teflon, Halar etc.)
301 first cylindrical section of connector 300
302 second cylindrical section of connector 300
304 Catch feature
401 Elastomeric strap (preferably made of EPDM (ethylene propylene diene monomer—M-class) rubber or natural rubber.
501 Elastomeric strap (preferably made of EPDM (ethylene propylene diene monomer—M-class) rubber or natural rubber.
600 Plastic hook device (preferably made of solid over-molded steel core hooks over-molded with Polycarbonate, Polyethylene or Nylon with inner hardened steel core hook (preferably made of high carbon spring wire (music wire ASTM A 228 or hard drawn ASTM A 227) formed in the shape of a hook).
601 Connector groove.
701 Elastomeric cord (preferably made of Premium latex rubber core, OCE fiber, EPDM rubber strands surrounded by woven polyester, nylon or cotton yarn sheath).
800 Plastic hook device (preferably made of solid over-molded steel core hooks over-molded with Polypropylene, Polycarbonate, Polyethylene or Nylon or other thermoplastic polymer with inner hardened steel core hook made from steel wire or steel formed in the shape of a hook).
801 Connector groove
802 Catch feature
803 Wire core (preferably made of high carbon spring wire (music wire ASTM A 228 or hard drawn ASTM A 227)
804 Elastomeric cord (preferably made of Premium latex rubber core, OCE fiber, EPDM rubber strands surrounded by woven polyester, nylon or cotton yarn sheath).
805 Plane of connector groove 801
806 Hook centroid
807 Elastomeric cord bore (receptacle for flexible elongated member)
808 Hook
809 Attachment means access port
810 Hook body
811 Elastomeric member
812 Coil section of hook 803
813 Staple (preferably made of steel)
814 Plane of hook 808
815 Axis of elongated flexible member 811
816 Shank of hook 808
900 Elastic member and interlocking hook assembly (preferably made of Premium latex rubber core, OCE fiber, EPDM rubber strands surrounded by woven polyester, nylon or cotton yarn sheath) with Plastic hook (preferably made of solid over-molded steel core hooks over-molded with Polypropolene, Polycarbonate, Polyethylene or Nylon or other thermoplastic polymer with inner hardened steel core hook made from steel wire or steel formed in the shape of a hook).

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:
1. A flexible elongated member with interlocking hook devices comprising a flexible elongated member having two ends, with each end connected to a said hook device, each said hook device comprising a hook body having a body diameter connected to a straight flat hook which has a hook diameter, a shank section, and a bend section;
    wherein the hook body contains a connector groove which can receive the hook of a similar said hook device, the connector groove having a similar contour to a shape formed by the hook;
    wherein two said similar hook devices can be engaged one upon the other by inserting the hook of each hook device into the connector groove of the other hook device thereby forming a closed hook assembly;
    wherein the hook body of each hook device is connected to each end of said flexible elongated member wherein each hook device can be engaged upon the other hook device to form a closed hook assembly and a closed loop of the flexible elongated member by means of engaging one hook device upon the other hook device;
    wherein the bend section and the shank section of each hook lie within a common plane;
    wherein the hook body diameter is substantially equal to the hook diameter; and
    wherein, the plane of the connector groove is not parallel to the plane of the hook.
2. The flexible elongated member with interlocking hooks of claim 1 wherein numerous flexible elongated members can be connected end-to-end by engaging the interlocking hook devices in series thereby providing a user with an extendable flexible elongated member having a closed hook assembly in the center of the extended flexible elongated member with an open hook on each end.
3. The flexible elongated member with interlocking hooks of claim 1 wherein the plane of the connector groove lies at an obtuse angle to the plane of the hook.
4. The flexible elongated member of claim 1, wherein the flexible elongated member is a bungee cord.
5. An apparatus comprising a flexible elongated member with interlocking hook devices, wherein:
    said flexible elongated member has two ends, with each end connected to one of said hook devices, each hook device comprising a hook body connected to a straight flat hook, the hook having a hook shank and a bend section;

wherein the hook body contains a connector groove which can receive the hook of the other said hook device, the connector groove having a similar contour to a shape formed by the hook;

wherein the bend section and the hook shank of each hook lie within a common plane;

wherein two said hook devices can be engaged one upon the other by inserting the hook of each hook device into the connector groove of the other hook device thereby forming a closed hook assembly; and wherein the hook body of each hook device is connected to each end of said flexible elongated member wherein each hook device can be engaged upon the other hook device to form a closed hook assembly and a closed loop of the flexible elongated member by means of engaging one hook device upon the other hook device, and wherein the hook shank is substantially parallel to an axis of the flexible elongated member.

6. The apparatus of claim 5, wherein the flexible elongated member is a bungee cord.

7. An interlocking hook device comprising a hook body connected to a hook, the hook having a shape, a plane, a centroid, and a diameter;

wherein, the hook body contains a connector groove which can receive a second hook of a similar hook device, the connector groove having a plane and a similar contour to the shape formed by the second hook of the similar hook device; and wherein each hook is straight and flat and has a hook section and a shank section that lie within a common plane; and wherein, the plane of the connector groove lies at an obtuse angle to the plane of the hook.

8. The interlocking hook device of claim 7 wherein two similar hook devices can be coupled together with the hook engaging to the connector groove of the other hook.

9. The interlocking hook device of claim 7 wherein, an assembly of two similar hook devices, one upon the other, results in the plane of each hook crossing the plane of the other hook.

10. The interlocking hook device of claim 7 wherein, the hook device is made of solid over-molded steel core hooks over-molded with polypropylene, polycarbonate, polyethylene, or nylon with inner hardened steel core hook made from steel wire or steel formed in the shape of a hook.

11. An apparatus including two of said hooks of claim 7, and a flexible elongated member.

12. The apparatus of claim 11, wherein the flexible elongated member is a bungee cord.

* * * * *